US012778844B2

(12) United States Patent
Tsai

(10) Patent No.: US 12,778,844 B2
(45) Date of Patent: Nov. 3, 2026

(54) HEALTH-CARE DEVICE

(71) Applicant: TAO MINING CO., LTD., Taipei (TW)

(72) Inventor: Ching-Fu Tsai, Taipei (TW)

(73) Assignee: TAO MINING CO., LTD., Taipei (TW)

( * ) Notice: Subject to any disclaimer, the term of this patent is extended or adjusted under 35 U.S.C. 154(b) by 1261 days.

(21) Appl. No.: 17/600,320

(22) PCT Filed: Mar. 31, 2021

(86) PCT No.: PCT/CN2021/084762

§ 371 (c)(1),
(2) Date: Sep. 30, 2021

(87) PCT Pub. No.: WO2021/218562

PCT Pub. Date: Nov. 4, 2021

(65) Prior Publication Data

US 2022/0296465 A1 Sep. 22, 2022

(30) Foreign Application Priority Data

Apr. 30, 2020 (WO) ................ PCT/CN2020/088533
Aug. 7, 2020 (WO) ................ PCT/CN2020/107950

(51) Int. Cl.
*A61H 39/00* (2006.01)
*A61H 37/00* (2006.01)

(52) U.S. Cl.
CPC ............. *A61H 39/00* (2013.01); *A61H 37/00* (2013.01); *A61H 2201/0107* (2013.01); *A61H 2201/165* (2013.01); *A61H 2201/5058* (2013.01)

(58) Field of Classification Search
CPC .................... A61H 39/00; A61H 37/00; A61H 2201/0107; A61H 2201/165;
(Continued)

(56) References Cited

U.S. PATENT DOCUMENTS 1,481,354 A * 1/1924 Dingfeld ................ A61H 39/04 602/74
4,479,495 A * 10/1984 Isaacson ................ A61H 39/04 D24/211

(Continued)

FOREIGN PATENT DOCUMENTS

CN 2173060 Y 1/1993
CN 2173060 8/1994

(Continued)

OTHER PUBLICATIONS

English Translation of CN105832530A to Wang (Year: 2016).*

*Primary Examiner* — Sunita Reddy
(74) *Attorney, Agent, or Firm* — Michael W. Taylor; Wolter Van Dyke Davis, PLLC

(57) ABSTRACT

A health-care device includes a work piece having an operating end and a opposite working end to perform a health-care work on a specific part or an acupoint of a body part of a user; a work body at its lower part of the operating end is mounted so that a specific working relationship between the working end and the specific part or the acupoint is maintained; and a device positioning piece connected to the work body for maintaining a specific positional relationship between the working end and the specific part or the acupoint.

17 Claims, 23 Drawing Sheets

(58) Field of Classification Search
CPC ............ A61H 2201/5058; A61H 7/001; A61H 39/002; A61H 39/08; A61H 2201/0157; A61H 2201/149; A61H 2201/1664; A61H 2201/5043; A61H 2201/5053; A61H 2201/5082; A61H 2205/12; A61H 39/04; A61H 39/02; A61H 2039/005; A61H 2201/5064; A61H 2201/5071; A61H 2205/065; A61H 39/06; A61H 7/00; A61H 2201/10; A61H 2201/1635; A61H 2201/164; A61H 2201/1652; A61H 2201/1695; A61H 2201/50
USPC .......................... 128/897–899; 606/189, 204
See application file for complete search history.

(56) References Cited

U.S. PATENT DOCUMENTS

| | | | | | |
|---|---|---|---|---|---|
| 4,966,164 | A * | 10/1990 | Colsen | A61H 39/002 | 607/136 |
| 6,113,620 | A * | 9/2000 | Chung | A61H 39/04 | 606/189 |
| 2004/0044390 | A1* | 3/2004 | Szeles | A61N 1/32 | 607/142 |
| 2004/0111128 | A1* | 6/2004 | Wang | A61H 39/02 | 607/46 |
| 2006/0270956 | A1* | 11/2006 | Wong | A61H 39/04 | 601/108 |
| 2007/0239092 | A1* | 10/2007 | Ross | A61F 5/28 | 602/26 |
| 2008/0058915 | A1* | 3/2008 | Chang | A61H 39/02 | 607/140 |
| 2009/0248062 | A1* | 10/2009 | Benigna | A61H 39/04 | 606/204 |
| 2015/0224025 | A1* | 8/2015 | Darna | A61H 39/04 | 606/204 |
| 2016/0175192 | A1* | 6/2016 | Cheng | A61H 39/04 | 606/204 |
| 2018/0116906 | A1* | 5/2018 | Hirashiki | A61N 1/0476 | |
| 2020/0121556 | A1* | 4/2020 | Tian | A61H 39/02 | |
| 2020/0269123 | A1* | 8/2020 | Sachs | A63B 24/0062 | |
| 2021/0022959 | A1* | 1/2021 | Li | A61H 39/086 | |
| 2021/0244614 | A1* | 8/2021 | Li | A61H 39/083 | |
| 2022/0175615 | A1* | 6/2022 | Lin | A61H 39/04 | |

FOREIGN PATENT DOCUMENTS

| | | | |
|---|---|---|---|
| CN | 201101700 | Y | 11/2007 |
| CN | 205094975 | U | 11/2015 |
| CN | 105832530 | | 8/2016 |
| CN | 107213013 | A | 7/2017 |
| CN | 109875878 | | 6/2019 |
| WO | 2018/173309 | | 9/2018 |

* cited by examiner

HEALTH-CARE DEVICE

FIELD OF THE INVENTION

The present invention relates to a health-care device, and can be related to acupoints.

The present invention claims the priorities of the PCT Publication No. PCT/CN2020/088533 filed on Apr. 30, 2020 and the PCT Publication No. PCT/CN2020/107950 filed on Aug. 7, 2020, and is intended to supplement other embodiments that are not fully disclosed therein. Except for the supplementary descriptions provided below, the content before FIG. 16 is basically the same as that of the latter (second) priority application. However, it can be known from the novelty search report of the second priority application that there are four prior applications in Mainland China and one prior application in Japan that may be similar to the present application. Therefore, descriptions have been added for discussions of differences between the present invention and any of five prior applications.

BACKGROUND OF THE INVENTION

The five prior applications are somehow similar to the present invention, namely: 1. CN107213013A filed on Jul. 7, 2017; 2. CN205094975U filed on Nov. 16, 2015; 3. CN2173060Y filed on Jan. 19, 1993; 4. CN201101700Y filed on Nov. 15, 2007; and 5. WO2018/173309 filed on Jul. 4, 2017.

Differences between the present invention and the five applications are briefly discussed as follows.

1. For the first application CN107213013A, the fourth application CN201101700Y and the fifth application WO2018/173309, the user must first adjust the protrusion height of the working end in order to try to tie the working device to a body part, and thus it is necessary to repeatedly loosen and tie it to find the correct protrusion height of the working head.
2. For the second application CN205094975U, we can know that (1) the design of its fixed base 4 makes it difficult for the users to visually aim or align the device with the correct or optimal position of an acupoint, (2) the design is obviously only suitable for pressing, but not for other applications (such as microwave or moxibustion), and (3) its design origin and concept are quite different from those of the present invention based on the fact that the fixed base 4 is fixed on the lower curved substrate 7.
3. For the third application CN2173060Y, because the pressure 6 head is hidden, the user cannot visually adjust or accurately position the device at a precise location, and it has defects in the first, fourth and fifth applications.

Probably because of the aforementioned reasons, it is difficult to find their application products on the market so far. Therefore, as stated in the aforementioned basic parent applications, the following situation still exists:

Those who lose their health will know that being free from disease or pain is a great blessing for life. It is human nature to be greedy for life and to fear death. Longevity is something most people hope for. Everyone seems to agree that prevention is better than cure, but on the life journey of birth, aging, sickness and death, not everyone has the opportunity or perseverance to always pay attention to prevention. The present invention follows the Chinese genius doctors Hua Tuo and Bian Que, and attempts to bring health and happiness to mankind.

SUMMARY OF EXEMPLARY EMBODIMENTS

Because the content in the aforementioned basic parent applications is already abundant and comprehensive, it seems appropriate not to add more content. As such, the present invention aims to supplement other embodiments not fully disclosed. In detail, the health-care body and health-care device disclosed in the aforementioned basic applications are relatively large in size and occupy a large space, while what the present invention tries to complement focuses on extreme light and portability, which pursues the effect as if a competent doctor stands by you at any time even when you travel outside.

Because the aforementioned basic parent applications have fully disclosed principles, theoretical basis and ideals of the present invention, their content is fully incorporated here to avoid repetition. Another ideal of the present invention is to impart handiness to the acupoint work piece or flexible health-care body. The present application clearly proposes embodiments other than that involving pressing to clearly show that such structures are not limited to pressing, but can be applied by any health-care technology related to acupoints. The so-called health-care work here refers to a health-care activity that works on a specific body part or an acupoint so that a subject on which the work is performed can obtain health effects, wherein the health-care work may be such as electrical stimulation, light stimulation, thermal stimulation, non-invasive or non-contact acupoint stimulation mode, microwave stimulation, magnetic stimulation and/or traditional acupuncture.

The lightness and handiness aimed at in the present invention are not limited to the miniaturization of the originally disclosed device body, but involves the achievement of convenience so that the device can be used anytime and anywhere.

The present invention also seeks to be a product that can be regarded as a fashionable, practical or decorative item.

BRIEF DESCRIPTION OF THE DRAWINGS

The embodiments are drawn based on examples, so they are merely illustrative of the inventive concept.

DETAILED DESCRIPTION OF THE PREFERRED EMBODIMENTS

Hereinafter, embodiments of the present invention are disclosed one by one in conjunction with the drawings. Just like in the parent applications, an implementing manner in the present application is merely an embodiment used to assist in understanding a certain idea, and is not the only feasible way or a limitation of the idea. On the contrary, descriptions of embodiments for another idea can usually be a reference for replacing or modifying said idea.

Figure 1:
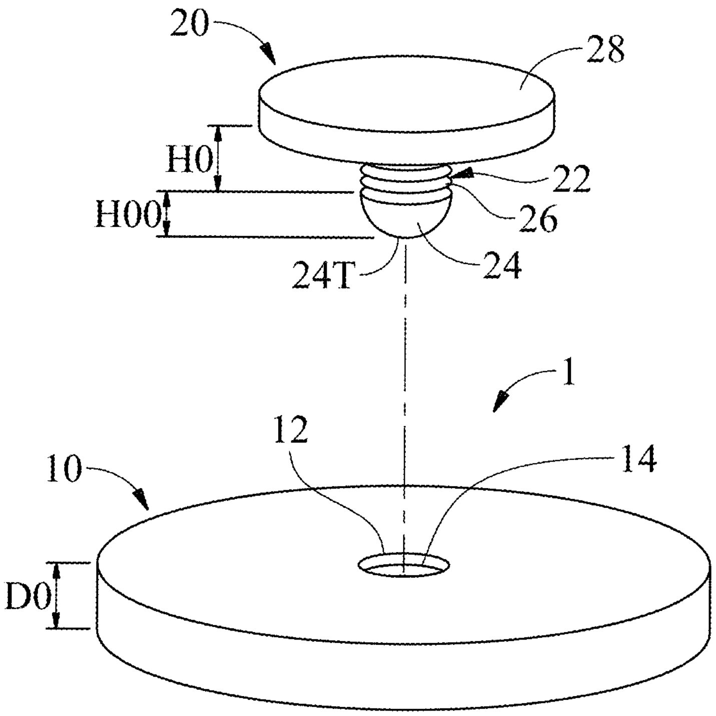
FIG. 1 is a first embodiment of an acupoint working piece.

In FIG. 1, a first embodiment of an acupoint working device 1 according to the present invention comprises a work body 10 and a work piece 20, wherein work body 10 has a central hole 12 with an internal thread 14, and a thickness D0. Work piece 20 has a working rod 22 and an operating part 28, and working rod 22 has a working end 24 and a threaded part 26. The height H0 of threaded part 26 (that is, the length extending downward from the bottom surface of operating part 28 of work body 10) is slightly larger than thickness D0 of work body 10 so as to determine the extent of working end 24 protruding from work body 10 after screwedly engaging threaded part 26 with internal thread 14. Operating part 28 is provided for manual operation to determine the non-invasive depth or force for pressing acupoints by working end 24.

The degree of pressure that acupoints can bear may be different due to (1) age, (2) physique and (3) coarseness/slenderness of the skin/muscle texture. In addition, as we know, pressure is derived from (4) force divided by (5) area, that is, in addition to the force magnitude, the bearing area is also a decisive factor under the same weight. The pressures for acupoints in the following table may have covered entire ranges after considering the above five factors, while two embodiments of the bearing areas show the corresponding forces.

| Pressing level | Pressures on acupoint | Forces borne on an area of 0.03 $cm^2$ | Forces borne on an area of 0.07 $cm^2$ |
|---|---|---|---|
| Light | 3-12 $kgf/cm^2$ | 0.09-0.36 kgf/ 0.882-3.528 N | 0.21-0.84 kgf/ 2.058-8.232 N |
| Heavy | 8-18 $kgf/cm^2$ | 0.24-0.54 kgf/ 2.352-5.292 N | 0.56-1.26 kgf/ 5.488-12.348 N |

*1 kgf = 9.8 N

Generally speaking, when we press the acupoint with finger, the action area is about 0.3 $cm^2$ (the real action area of the finger is 1 cm*0.3 cm), so the force pressing the acupoint, light or heavy, is about 0.9-5.4 kgf. It is this force that causes the person applying the finger pressure to feel fatigue. If the person uses a reduced area (no matter whether it is 0.03 $cm^2$ or 0.07 $cm^2$) on working end 24 in FIG. 1 to do this, the required force will only be 0.09-1.26 kgf (even if the action area is enlarged to 0.2 $cm^2$, the required force will only be 0.6-3.6 kgf). Not only is it obviously much easier, but also because it does not need physical effort or something else to do it, so the person will not feel fatigue, and thus it can serve the user at any time. The shape of working end 24 is preferably bluntly rounded. If its full rounded area is less than 0.02 $cm^2$, it is easy to cause pain feeling, but to those with weaker muscles, it may hurt, so it should not be less than 0.02 $cm^2$. On the other hand, if its rounded area is larger than 0.8 $cm^2$, it is unlikely to cause the pain feeling, but it may not be able to accurately interact with the acupoint. Thus, preferably, the rounded area is in a range between 0.05 $cm^2$ and 0.6 $cm^2$.

In other words, the present invention uses working end 24 to serve as the hand of the Chinese physician to work on acupoints. What are the differences between treatment effects of the acupuncture and the finger pressure? Experienced Chinese physicians (such as Professor Pan Longsen/Chinese physician) will answer: if you can precisely get the acupoints, the effect of finger pressing can reach 80% of that of acupuncture. Here, we can further analyze as follows: although the effect of finger pressure is only 80% of that of acupuncture, the acupuncture time is limited and quite expensive. Therefore, if users own acupoint working device 1, by lengthening the pressing time, they can turn defeat into victory in terms of the cumulative effect (instant effect*application time).

Figure 2:
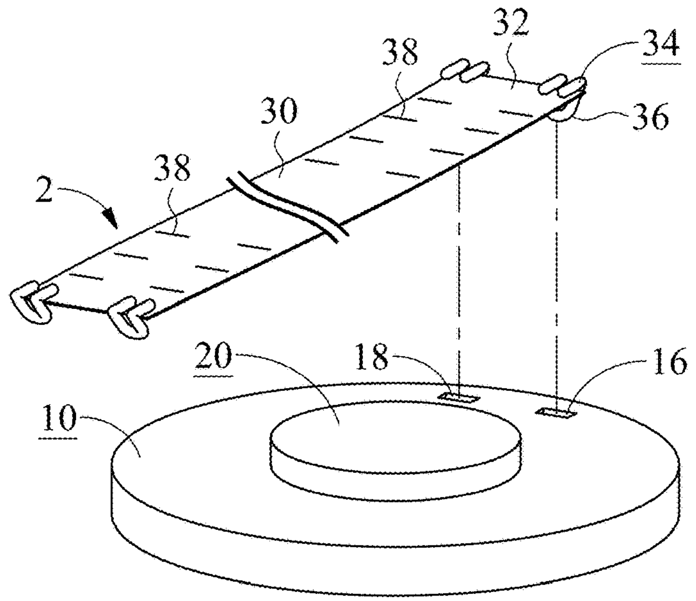
FIG. 2 is a first embodiment of a health-care device.

Please refer to FIG. 2 for the use of health-care device 1. Work body 10 further includes two recesses 16, and each recess 16 has an inclined hook portion 18. In order to make use of working end 24, a flexible health-care body 30, namely a cloth strip 30, has two ends 32, each provided with two hooks 34, each of which has a hook end 36 left oblique downward to hook with the hook portion 18. Cloth strip 30 is configured with a plurality of buckling line segments 38 near each end 32 such that cloth strip 30 is used to wind health-care device 1 around the user. According to a specific body size and the remaining length of the last loop, users may select the most appropriate pair of the buckling line segments 38 to fix the acupoint working device 1 so that a positioning relationship between acupoint working device 1 and a specific acupoint of the user is maintained. Thus, acupoint working device 1 and cloth strip 30 together constitute a health-care device 2, which has effects comparable to various health-care devices in the parent application. Certainly, for the sake of beauty, cloth strip 30 can be silk, or any other delightful quality or design.

In use, flexible health-care body 30 is used to fix health-care device 1 to the body part such that working end 24 and the acupoint maintain a positioning relationship with each other, wherein the body part has a skin surface. A first end 32 of flexible health-care body 30 can be connected to work device 10 as above-described, or simply put on the skin surface or health-care device 1. Because flexible health-care body 30 is of a cloth nature, so that after winding for several times, first end 32 is automatically held between itself and work body 10 (and/or acupoint work piece 20 or the surface of the skin). Thus, a plurality of pairs of buckling line segments 38 are sewed or configured on the surface near another end 32 of flexible health-care body 30 for positioning by hooking hooks 34. Thus, under the restriction of the specific positional relationship, a tip 24T of working end 24 performs the pressing or health-care work on the acupoint by a working depth between tip 24T and the skin surface.

According to plumpness and different body parts, finger(s) or working end 24 depress(es) the skin surface in a depth about 0.1-3 cm. Preferably, or for a normal body type, it is between 0.2-2 cm. For all body parts, a more preferably or common working depth is usually in a range of 0.3-1.5 cm. Therefore, if a height H00 of working end 24 is set at 0.2 cm, we can obtain H0 (a height of threaded part 26) is a little bit larger than D0 (a thickness of work body 10), which means that H0 should not exceed 1.8 cm. Because the acupoints of the chest and back are not far away from the organs, for these acupoints, the height of tip 24T (FIG. 1) below the skin surface should not exceed 0.3 cm. Certainly, H0 for these acupoints should better be equal to D0 to ensure safety. Specifically, although the working depth of work piece 20 can be completely defined by height H00, in order to fit or attach operating part 28 with or on work body 10 to avoid a clumsy feeling presented by health-care device 1 on the skin surface, threaded part 26 is better completely locked into internal thread 14. Thus, the working depth of health-care device 1 is preferably determined by threaded part 26 and/or working end 24 protruding beyond the lower surface of work body 10, and the range of height H00 must be at least 0.1-0.3 cm to prevent threaded part 26 from contacting the skin and causing the uncomfortable feeling of the skin. Certainly, at the body part suitable for a relatively deeper working depth, because the present invention is non-invasive, if height H00 is set in a range between 0.3 cm and 0.5 cm, the total height H0 (inclusive of D0) of threaded part 26 being larger than thickness D0 of work body 10 is obtained to be in the range of 1.5-1.7 cm (assuming the total work depth is in the preferable range of 0.2-2 cm). For another aspect, if the working depth is fully executed by working end 24, under the preferable working depth above, the length of working end 24 can reach 2 cm. On the contrary, if the working depth is mainly performed by threaded part 26, considering the circumstances that the height of working end 24 is preferably 0.3 cm, the height of threaded part 26 larger than the thickness of work body 10 should be less than 1.7 cm. But, considering the adjustment demands of the work depth for different acupoints, the better or more common range of threaded part 26 should be between 0.3 cm and 1.5 cm.

Figure 3:
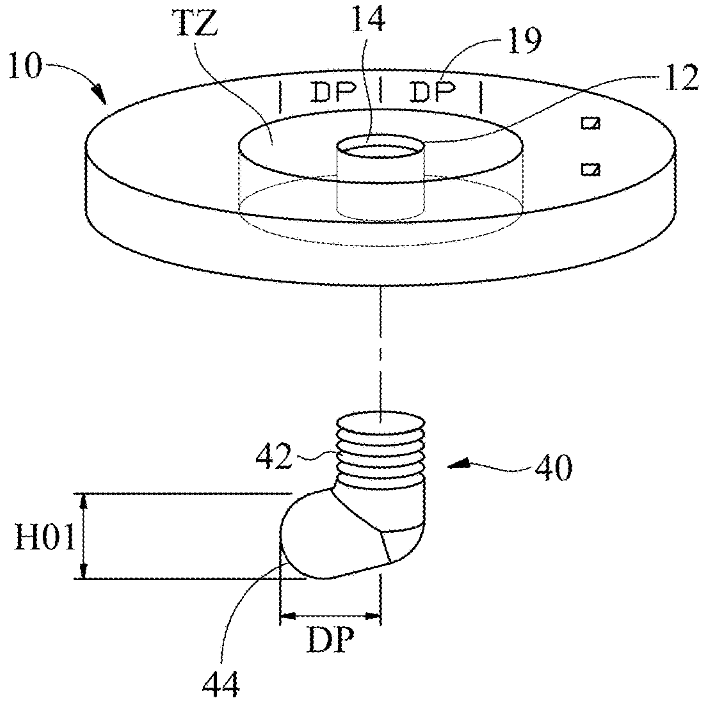
FIG. 3 is a second embodiment of the acupoint working piece.

In Huangdi Neijing Lingshu, Chapter Nine-Needle Twelve-Origin, it is recorded that "[T]he essentials of small needles are easy to talk but difficult to master. A superficial artisan pursues the appearance while a skillful one grasps the spirits." The principle of acupuncture is easy to mention, but it is never easy to reach the core essentials thereof. Those superficial care much about the appearance of how acupuncture is performed, while the genius doctors resort to fully understand how and why a specific acupuncture activity is executed. There are endless secrets hidden in the small universe of the human body, and some acupoints are not easy to locate. Taking the Hegu acupoint of the Hand yangming Large Intestine Meridian as an example, there are three ways to get this acupoint, namely, (1) the middle point of the line between the junction of the metacarpal bone of the thumb and the metacarpal bone of the index finger and the bottom edge of the purlicue, (2) the highest point of the lumped muscles after closing together the metacarpal bone of the thumb and the metacarpal bone of the index finger, and (3) after pressing the middle point of the fingerprint (commonly known as the eye of Confucius) between the former two bones of the thumb of the other hand against the center of the bottom edge of the purlicue of the target hand for taking the acupoint, the midpoint of an arc the tip of the thumb of the other hand forms on the skin between the metacarpal bone of the thumb and the metacarpal bone of the index finger of the target hand for getting the acupoint. It is quite accurate to take Hegu acupoint by any of these three methods, but the master acupuncturists (such as Professor Pan Longsen) will say, "you must incline towards the middle of the metacarpal bone of the index finger" in order to obtain the "real nest" of Hegu acupoint. To achieve this function, please refer to FIG. 3, which is a second embodiment of work piece 40 of the present invention, wherein work piece 40 has an inclined working end 44 and a threaded part 42 for screwing in central hole 12 of work body 10.

The height of threaded part 42 of work piece 40 can be equal to H0+D0 in FIG. 1, and inclined working end 44 has a vertical component H01, which can be equal to H00 in FIG. 1, and a horizontal offset component DP. In order for the user to easily know offset component DP, it is preferable to display offset component DP on work body 10 so that the value of offset component DP is reflected when a user uses, searches for or locates an acupoint. In addition, in order to facilitate the user to identify/find the acupoint, work body 10 preferably has at least one transparent zone TZ. We can notice here that inclined working end 44 also plays the role of the operating part to screw work piece 40 to work body 10.

The embodiments disclosed so far for the present invention are summarized as follows. A health-care device 2 comprises acupoint work piece 20 having working end 24 for performing a pressing work on an acupoint of a body part of a user; work body 10 on which acupoint work piece 20 is configured for the user to align working end 24 with the acupoint, wherein acupoint work piece 20 and work body 10 constitute health-care device 1; and flexible health-care body 30 used to position health-care device 1 on the body part, so that working end 24 and acupoint are maintained in a specific positional relationship with each other, wherein the body part has a skin surface, and flexible health-care body 30 has first end 32 connected to work body 10 or placed on the skin surface or health-care device 1, and second end 32 to position flexible health-care body 30, so that under the restriction of the specific positional relationship, tip 24T of the working end 24 performs the pressing or health-care work on the acupoint with a working depth between tip 24T and the skin surface.

A health-care device 2 as described in the preceding embodiments, wherein the working end is in a blunt round shape, and the full circular area is in a range between 0.02 $cm^2$ and 0.8 $cm^2$, and preferably between 0.05 $cm^2$ and 0.6 $cm^2$.

A health-care device 2 as described in the preceding embodiments, wherein the working end has a height in a range of 0.1 to 2 cm.

A health-care device 2 as described in the preceding embodiments, wherein the working depth is in a range between 0.1 cm and 3 cm, preferably or more commonly in a range between 0.2 and 2 cm, and according to different body parts, the preferable working depth is in a range between 0.3 cm and 1.5 cm A health-care device 2 as described in the preceding embodiments, wherein the height of the threaded part being greater than the thickness of the work body is preferably or more commonly in a range between 0.3 cm and 1.5 cm.

A health-care device 2 as described in the preceding embodiments, wherein height H00 of the working end 24 is in a range between 0.1 and 0.3 cm, and the total height H0 (inclusive of D0) of threaded part 26 being greater than the thickness D0 of the work body 10 is in a range between 1.7 cm and 1.9 cm.

A health-care device 2 as described in the preceding embodiments, wherein work body 10 is circular and has central hole 12; acupoint work piece 20 has working rod 22 and operating part 28; and working rod 22 has working end 24 and threaded part 26 screwed in central hole 12.

A health-care device 2 as described in the preceding embodiments, wherein threaded part 26 has height H0 slightly larger than thickness D0 of the work body to determine the extent beyond which working end 24 protrudes from the work body after threaded part 26 screwedly engages with internal thread 14; and operating portion 28 is provided for manual operation to determine a depth or a force for working end 24 to press the acupoint.

A health-care device 2 as described in the preceding embodiments, wherein the pressing force is in a range of 3 to 12 kgf/cm$^2$ or 8 to 18 kgf/cm$^2$.

A health-care device 2 as described in the preceding embodiments, wherein work body 10 further includes two recesses 16, each having hook portion 18 inclined leftwise and downward, and flexible health-care body 30 is cloth strip 30 with two ends 32. Each end 32 is configured with two hooks 34, each having hook end 36 inclined leftward and downward for buckling into hook portion 18. A plurality of pairs of buckling line segments 38 are provided near each end 32 for two hooks 34 of end 32 to be buckled and positioned.

A health-care device 2 as described in the preceding embodiments, wherein cloth strip 30 can be silk, spun silk or embroidered with patterns or aesthetic designs.

A health-care device 2 as described in the preceding embodiments, wherein acupoint work piece 40 has inclined working end 44 and threaded part 42 for screwing into central hole 12 of work body 10, wherein inclined working end 44 has a horizontal offset component DP, and on work body 10, such offset component DP is displayed and there is transparent zone TZ for the user to find or locate acupoints.

For another aspect, the preceding embodiments disclose health-care device 1 comprising acupoint work piece 20 with working end 24 for performing a pressing work on an acupoint of a body part of a user, wherein working end 24 has tip 24T, and the body part has a skin surface; and work body 10 on which acupoint work piece 20 is configured for the user to align working end 24 with the acupoint, so as to maintain a specific positional relationship between working end 24 and the acupoint. When health-care device 1 is operated in such a way that there is a working depth between tip 24T and the skin surface, under the restriction of the specific positional relationship, the pressing or the health-care work will be performed on the acupoint.

For another aspect, the preceding embodiments disclose flexible health-care device 30 for use in conjunction with health-care device 1, wherein health-care device 1 comprises acupoint work piece 20 and work body 10, acupoint work piece 20 has working end 24 for performing a pressing work on an acupoint of a body part of a user, working end 24 has tip 24T, the body part has a skin surface, acupoint work piece 20 is configured on work body 10 for the user to align working end 24 with the acupoint, flexible health-care body 30 is an easy-to-wrap object for positioning health-care device 1 on the body part, and flexible health-care body 30 includes first end 32 connected to work body 10 or placed on the skin surface or health-care device 1, and second end 32 for being positioned on flexible health-care body 30 when a specific positional relationship between working end 24 and the acupoint is maintained by flexible health-care body 30. Thus, under the restriction of the specific positional relationship, health-care device 1 performs the pressing or the health-care work on the acupoint because there is a working depth between tip 24T and the skin surface.

Figure 4:
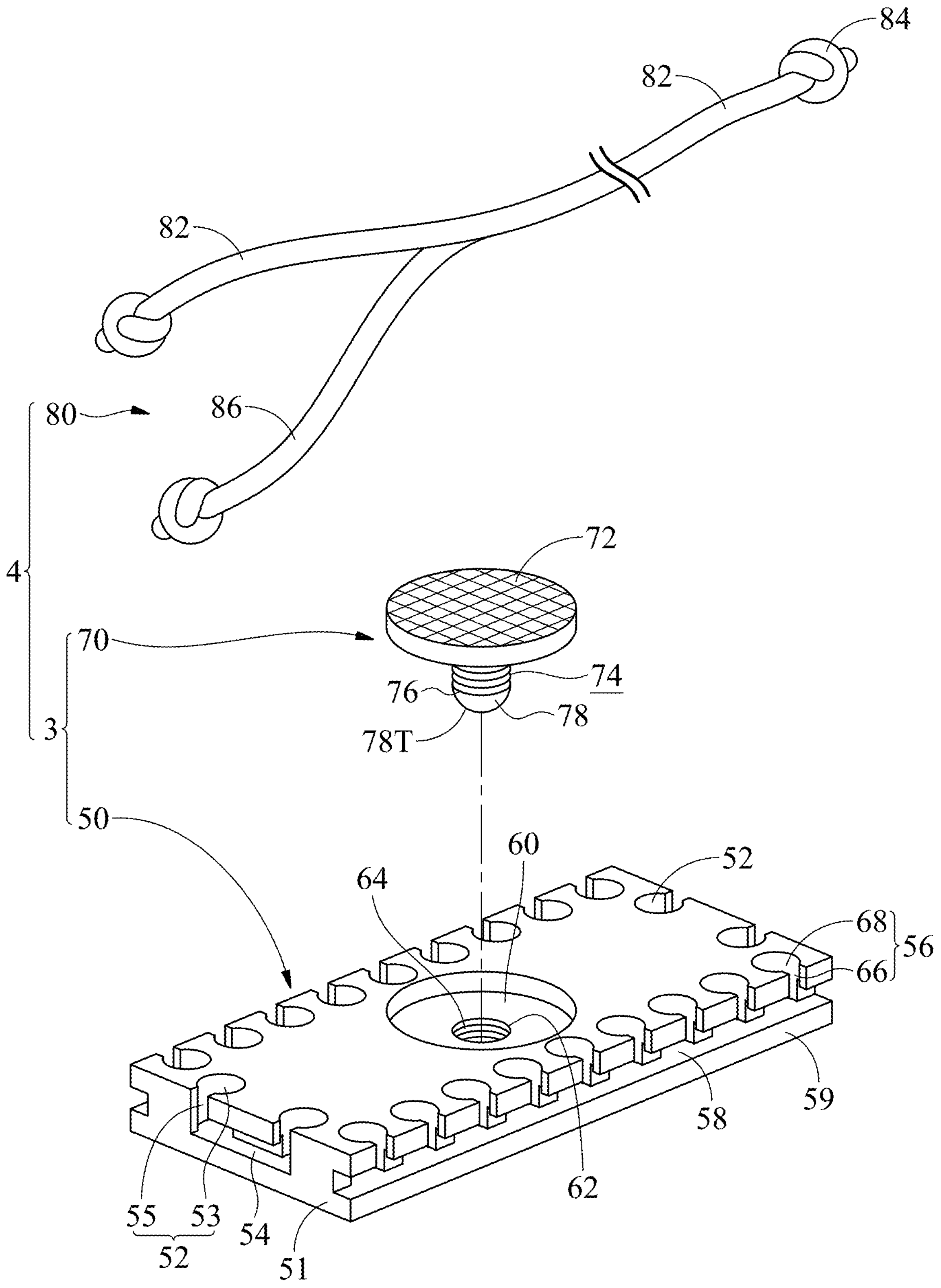
FIG. 4 is a second embodiment of the health-care device.

Please refer to FIG. 4, a second embodiment of a health-care device 4 according to the present invention comprises a health-care device 3 and a flexible health-care body 80. The health-care device 3 includes a work body 50 and a work piece 70, wherein work body 50 has two ends 51, two sides 59, a central hole 62 with an internal thread 64, a central recess 60, and a thickness similar to D0 in FIG. 1 but having no legend in this figure for simplicity. Each end 51 or side 59 has a plurality of mooring media 52 or 56, each having a larger mooring area 53 (68) and a restraint area 55 (66) communicating with mooring area 53 (68). Each mooring medium 52 (56) communicates with the groove 54 (58) provided on end 51 (or side 59). Work piece 70 has an operating part 72 on its upper part and a working rod 74 having a working end 78 and a threaded part 76. Threaded part 76 has a height (that is, the depth extending beyond the bottom surface of operating part 72 of work body 10), which must be at least slightly larger than the thickness of the work body to facilitate in determining the protruding extent of working end 78 beyond work body 50 after threaded part 76 screwedly engages with internal thread 64. Because the principle is the same as that for FIG. 1, the principle is not repeated here.

Figure 5A:
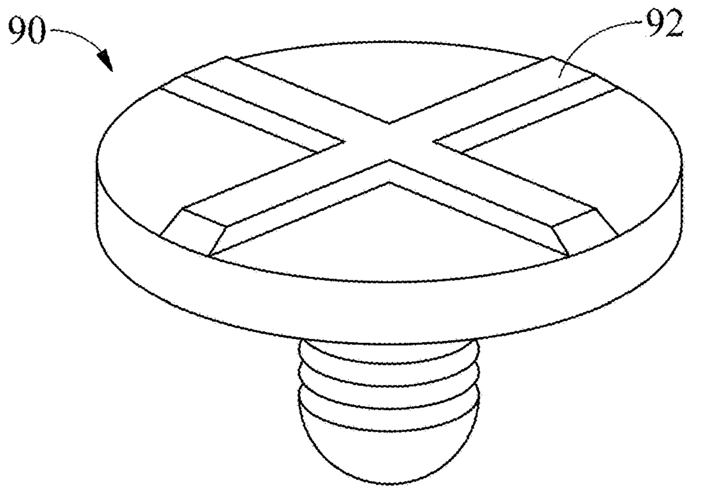
FIG. 5A is a second embodiment of an operating part of a working piece.
Figure 5B:
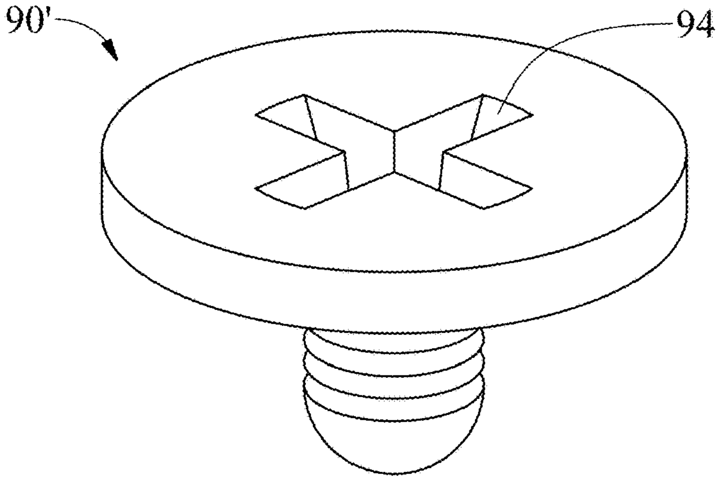
FIG. 5B is a third embodiment of the operating part of the working piece.

Operating part 72 has a rough surface in order to facilitate manual operations to determine the depth or force for working end 78 to press acupoints. As shown in FIG. 5A, an operating part 90 may be provided with a cross-shaped protrusion 92 for hand operations. As shown in FIG. 5B, an operating part 90' may either be provided with a cross-shaped groove 94, so that a coin can be used as an operating medium. Certainly, work body 50 must have a recessed area 60 around central hole 62 to receive operating part 72 in operation, so that health-care device 3 will have a flush surface.

Referring back to FIG. 4, to operate working end 78, a flexible health-care body 80 (namely a cloth strip, a scarf, or a string) with two ends 82 having wound end knots 84 is provided. The body of flexible health-body 80 has an appearance operating dimension for freely passing or being wound through restraint areas 55 (66) or grooves 54 (58), while an actual use size of each end knot 84 can cause one end 82 of flexible health-care body 80 to be restricted by mooring areas 53 (68), and thus after flexible health-care body 80 wraps and fixes acupoint working device 3 to an acupoint of the user, a most appropriate mooring or holding effect for end 82 of flexible health-care body 80 can be obtained by selecting a specific mooring area 53 (68), so that a positional relationship between acupoint working device 3 and a specific acupoint of the user is maintained. Therefore, acupoint working device 3 and flexible health-care body 80 together constitute a health-care device 4, which has efficacy comparable to that of various health-care devices in the parent applications. Certainly, for aesthetic reasons, flexible health-care body 80 may have various pleasant textures or designs. Certainly, for some acupoints, such as Hegu acupoint, there is no symmetrical skin surface around it for fixation. Thus, an auxiliary end 86 branched from one end 82 of the flexible health-care body (the left side of the figure) can be conveniently used to tie work body 50 in such a way that it is tightly attached to the skin surface of the user. Certainly, to have embodiments that there are auxiliary ends at both ends or more than one auxiliary end to facilitate the fixation to acupoints located particularly on curvy body parts (for example, Qiuxu acupoint or Jiexi acupoint), it is conceivable without further elaboration.

During use, flexible health-care body 80 is used to position acupoint working device 3 on a body part by winding acupoint working device 3 around a specific body part, so that a specific positional relationship between working end 78 and the acupoint is maintained. An end 82 of flexible health-care body 80 can first be moored to one of mooring areas 53 (68) (although any mooring area 53 (68) can be optionally selected, it is preferable to select one end 51 or side 59 deviating from the winding direction). After winding acupoint working device 3 around the specific body part by flexible health-care body 80 several times to achieve proper positioning, according to the remaining length of the other end 82 of flexible health-care body 80, the other end 82 can be appropriately moored to one of mooring areas 53 (68) via mooring areas 53, restraint areas 55 and grooves 54 on both ends 51, and/or mooring areas 68, restraint areas 66 and grooves 58 on both sides 59. In this way, under the restriction of the specific positional relationship, a pressing or health-care work can be performed on the acupoint by a working depth of tip 78T of working end 78 below the skin surface.

The second embodiment of health-care device 4 of the present invention is summarized as follows. Health-care device 4 comprises acupoint work piece 70 with working end 78 for performing a pressing work on an acupoint of a body part of a user; work body 50 on which acupoint work piece 70 is mounted for the user to align working end 78 with the acupoint, wherein acupoint work piece 70 and work body 50 constitute a acupoint working device 3; and flexible health-care body 80 for positioning acupoint working device 3 on the body part to maintain a specific positional relationship between working end 78 and the acupoint, wherein the body part has a skin surface, and flexible health-care body 80 has first end 82 connected to work body 50 and second end 82 for being retained on work body 50, so that under the restriction of the specific positional relationship, a pressing or health-care work can be performed on the acupoint by a working depth between tip 78T of working end 78 and the skin surface.

A health-care device 4 as described in the preceding embodiments, wherein work body 50 has two ends 51, two sides 59, and central hole 62 with internal thread 64; each end 51 or side 59 has a plurality of mooring media 52 or 56; each mooring medium 52 (56) has mooring area 53 (68) with a larger size, restraint area 55 (66) communicating with mooring area 53 (68) and having a relatively smaller size, and groove 54 (58) that connects mooring media 52 (56) to each other on end 51 (or side 59); and work piece 70 has operating part 72 on its upper part and working rod 74 having working end 78 and threaded part 76 for screwedly engaging with internal thread 64.

A health-care device 4 as described in the preceding embodiments, wherein work body 50 has central recess 60 on its upper surface to receive operating part 72.

A health-care device 4 as described in the preceding embodiments, wherein operating part 72 is a rough surface, or operating part 90 or 90' is configured with cross-shaped protrusion 92 or groove 94.

A health-care device 4 as described in the preceding embodiments, wherein flexible health-care body 80 being a cloth strip, a scarf, or a string has two ends 82, each wound into knot 84; the body of flexible health-body 80 has an appearance operating dimension for freely passing or being wound through restraint areas 55 (66) or grooves 54 (58); and an actual use size of each end knot 84 can cause one end 82 of flexible health-care body 80 to be restricted in mooring areas 53 (68).

A health-care device 4 as described in the preceding embodiments, wherein a length of a loop surrounding acupoint working device 3 and the specific body part is X, a length between two knots 84 of flexible health-care body 80 is in a range between NX and (N+1)X, and N is greater than or equal to 2.

For another aspect, a health-care device comprises: acupoint work piece 70 having working end 78 for performing a pressing work on an acupoint of a body part of a user, wherein working end has tip 78T and the body part has a skin surface; and work body 50, on which acupoint work piece 70 is mounted for the user to align working end 78 with the acupoint, so that a specific positional relationship between working end 78 and the acupoint is maintained. In this way, under the restriction of the specific positional relationship, a pressing or health-care work can be performed on the acupoint when the health-care device is operated to cause a working depth existing between the tip and the skin surface.

For yet another aspect, flexible health-care body 80 used to cooperate with and position acupoint working device 3 on a body part of a user is provided, wherein the health-care device 4 comprises acupoint work piece 70 and work body 50; the acupoint work piece has working end 78 to perform a pressing work on an acupoint; working end 78 has tip 78T, and the body part has a skin surface; acupoint work piece 70 is mounted on work body 50 for the user to align working end 78 with the acupoint; and flexible health-care body 80 is an easy-to-wrap object for positioning the acupoint working device 3 on the body part. Flexible health-care body 80 further comprises: first end 82 connected to work body 50 or placed on the skin surface or acupoint working device 3; and second end 82 to be positioned on work body 50 when flexible health-care body 80 maintains a specific positional relationship between working end 78 and the acupoint, so that under the restriction of the specific positional relationship, the health-care device performs a pressing or health-care work on the acupoint because of a working depth between tip 78T and the skin surface.

The first end of a flexible health-care body as above-described further comprises branch auxiliary end 86.

Figure 6:
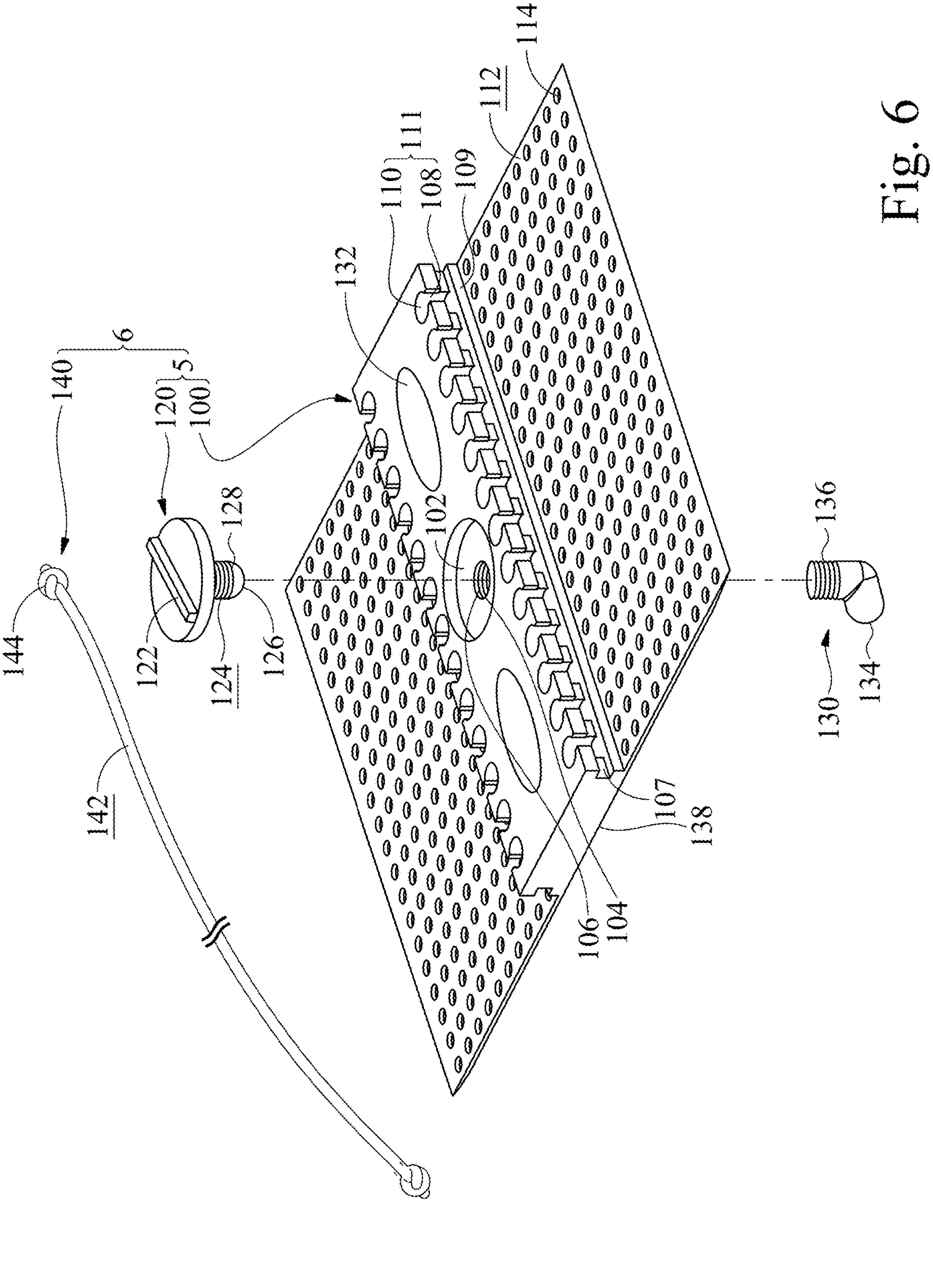
FIG. 6 is a third embodiment of the health-care device.

In FIG. 6, a third embodiment of a health-care device 6 according to the present invention comprises an acupoint working device 5 and a flexible health-care body 140. Acupoint working device 5 includes a work body 100 and a work piece 120 or 130, wherein work body 100 has two sides 109, a central hole 104 with an internal thread 106, a central recess 102, and a thickness similar to D0 in FIG. 1 but having no legend for simplicity of the figure. Each side 109 has a plurality of mooring media 111. Each mooring medium 111 has a larger mooring area 110 and a restraint area 108 communicating with mooring area 110, and communicates with the groove 107 provided on side 109. Work piece 120 has an operating part 122 on its upper part and a working rod 124 having a working end 126 and a threaded part 128. Threaded part 128 has a height (that is, the length extending beyond the bottom surface of operating part 122) slightly larger than the thickness of work body 100 to assist in determining the protruding extent of working end 126 beyond work body 100 after threaded part 128 screwedly engages with internal thread 106. Because the principle is the same as that for FIG. 1, it will not be repeated here. Acupoint work piece 130 is in the shape of a curved rod and has an inclined working end 134 and a threaded part 136. Working end 134 also plays the role of an operating part to fix work piece 130 to internal thread 106. In order to operate working end 126 (134), we use flexible health-care body 140, that is a thin rope, with two ends 142, each wound to have an end knot 144.

During use, flexible health-care body 140 is used to position acupoint working device 5 on a body part by winding acupoint working device 5 around a specific body part, so that a specific positional relationship between working end 126 (134) and the acupoint is maintained. An end 142 of flexible health-care body 140 is first moored to one of mooring areas 110 of work body 100 as above-described (although any mooring area 110 can be optionally selected, it is preferable to select one side 109 deviating from the winding direction). After winding acupoint working device 5 around the specific body part by flexible health-care body 140 several loops to achieve a proper attachment, according to the remaining length of the other end 142 of flexible health-care body 140, the other end 142 can be perfectly moored to a specific one mooring area 110 via mooring areas 110, restraint areas 108 and grooves 107 on both sides 109. In this way, under the restriction of the specific positional relationship, a pressing or health-care work can be performed on the acupoint by a working depth between the tip of working end 126 (134) and the skin surface.

The health-care device 6 described above is quite similar to the preceding two health-care devices 2 and 4, with difference that work body 100 has a bottom edge 138 and two lateral wings 112 extending from both sides of bottom edge 138. Each lateral wing 112 is provided with a plurality vent holes 114. Lateral wings 112 serves as a cushion for a body part, so as to prevent flexible health-care body 140 from leaving strangling marks on the skin surface after wound by force. Because the material of work body 100 is plastic, which has poor air permeability, vent holes 114 are additionally configured for free from stuffiness. Certainly, work body 100 itself can also be additionally provided with a plurality of vent holes 132.

This embodiment is summarized as follows. Health-care device 6 comprises acupoint work piece 120 with working end 126 for performing a pressing work on an acupoint of a body part of a user; work body 100 on which acupoint work piece 120 is mounted for the user to align working end 126 with the acupoint, wherein acupoint work piece 120 and the work body 100 constitute an acupoint working device 5; and flexible health-care body 140 for positioning acupoint working device 5 on the body part to maintain a specific positional relationship between working end 126 and the acupoint, wherein the body part has a skin surface, and flexible health-care body 140 has first end 142 connected to work body 100 and second end 142 for positioning on work body 100, so that under the restriction of the specific positional relationship, a pressing or health-care work can be performed on the acupoint by a working depth between working end 126 and the skin surface, wherein two lateral wings 112 extend from both sides of a bottom edge of work body 100.

According to the preceding embodiment, vent holes 114 are configured on each lateral wing 112 covering the body part, flexible health-care body 140 does not directly contact with the skin surface, and work body 100 can also be provided with vent holes 132.

Figure 7:
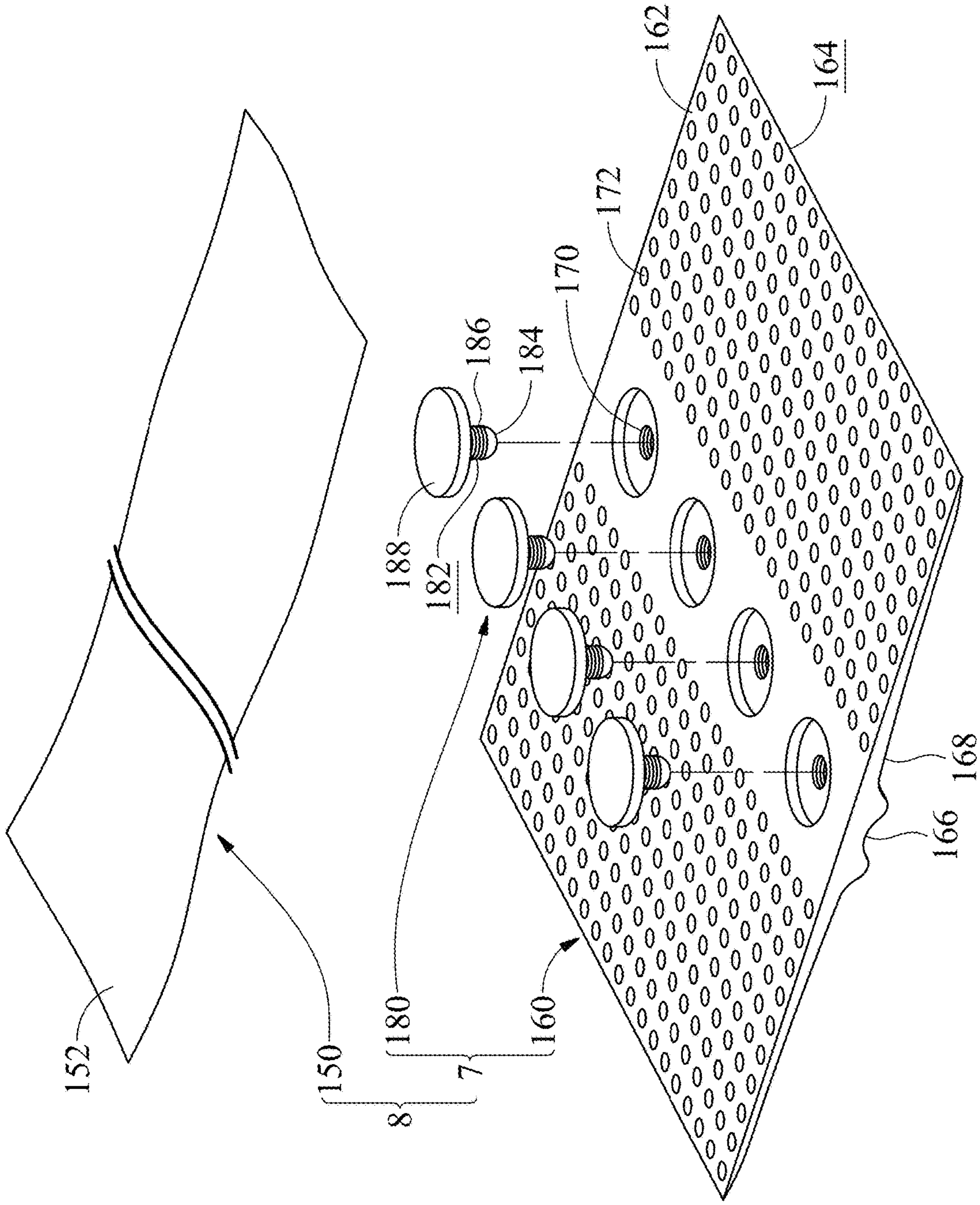
FIG. 7 is a fourth embodiment of the health-care device.

Please refer to FIG. 7. A fourth embodiment of a health-care device 8 according to the present invention comprises a health-care device 7 and a flexible health-care body 150. The health-care device 7 includes a work body 160 and a work piece 180, wherein work body 160 is in a shape of a flat plate and has an upper surface 162, a lower surface 164, a plurality of central holes 170, and a plurality of vent holes 172. Lower surface 164 has a central recess 166 to conform to the back spine of a user, and a curved inclined area 168 to conform to a back curving surface of the user's back that extends from the spine to the scapulas. Work piece 180 has an operating part 188 at its upper end and a working rod 182 having a working end 184 and a threaded part 186. The height of threaded part 186 (that is, the length extending from the bottom surface of operating part 188) must be at least slightly larger than the depth/height of central hole 170 of work body 160 to determine the protruding extent beyond which working end 184 protrudes from central hole 170 after threaded part 186 screws in central hole 170. The working principle being the same as that for FIG. 1 will not be repeated here. To operate working end 184, flexible health-care body 150 can be a scarf that the user already has. When health-care device 7 has been positioned, the user binds its two ends 152 in front of his chest to fix the health-care device to himself. Although this picture takes the back as an example, for a thinking agile person, he should be able to imagine some special parts of the human body, such as the instep. Because of the oblique extension of the instep, the upper surface of the work body is parallel to the foot, but the lower surface curvilinearly conforms to the instep. In this way, when a person wants to properly attach the relevant health-care device on a relevant body part, it will be easier to achieve the goal.

This embodiment is summarized as follows. Health-care device 8 comprises acupoint work piece 180 having working end 184 for performing a pressing work on an acupoint of a body part of a user; work body 160 on which acupoint work piece 180 is mounted for the user to align working end 184 with the acupoint, wherein acupoint work piece 180 and work body 160 constitute an acupoint working device 7; and flexible health-care body 150 used to position acupoint working device 7 on the body part to maintain a specific positional relationship between working end 184 and the acupoint, wherein the body part has a skin surface; and flexible health-care body 150 is a elongate soft object that the user has in home, and serves or is used for a tying work, so that the user can tie acupoint working device 7 to himself if the specific positional relationship is ensured.

A health-care device as described in the preceding embodiments, wherein work body 160 is in a plate shape and has upper surface 162, lower surface 164, central holes 170, and vent holes 172, lower surface 164 has central recess 166 to conform to the back spine of a user, and lower surface 164 has curved inclined area 168 to conform to a back curving surface of the user's back, wherein the back curving surface extends from the spine to the scapula.

A health-care device as described in the preceding embodiments, wherein the acupoint is located on a side of the body part, an upper surface of the work body is approximately parallel to an opposite side of the body part, and a lower surface of the work body conforms to the skin surface of the side, whereby it is easy for the flexible health-care body to fix the acupoint working device on the body part.

Figure 8:
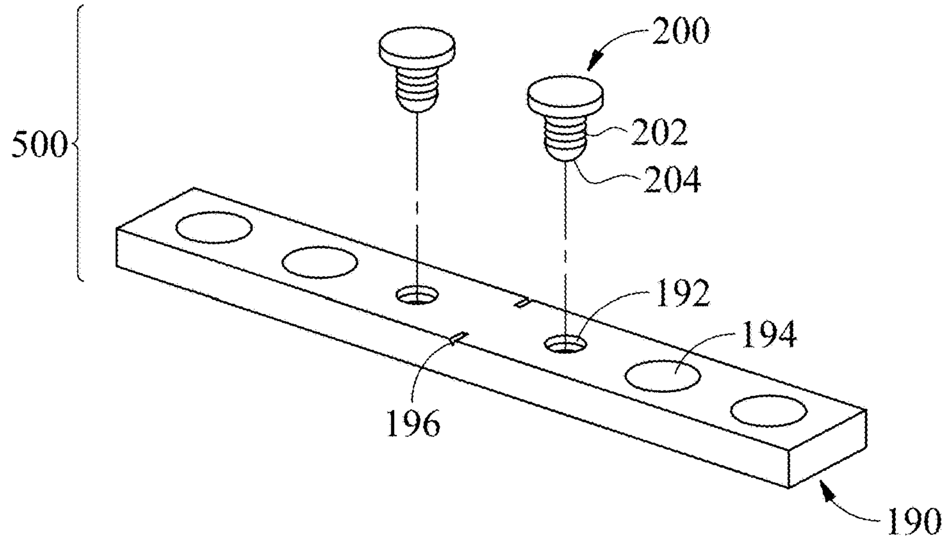
FIG. 8 is a fifth embodiment of the health-care device.

FIG. 8 is a fifth embodiment of a health-care device 500 of the present invention, comprising: an acupoint work piece 200 with a working end 204 for performing a pressing work on an acupoint of a body part of a user; and a work body 190, on which acupoint work piece 200 is configured for the user to align working end 204 with the acupoint, wherein acupoint work piece 200 has a threaded part 202 and working end 204 as in the preceding embodiments, and work body 190 has a reference center 196, two symmetrical holes 192 and a plurality of vent holes 194. Acupuncture and moxibustion are often performed symmetrically. Take the kidney meridian as an example, the conception vessel is used as a reference center, both sides of 0.5 body inches away from the conception vessel are the kidney meridians, and thus pressing must be applied symmetrically.

This embodiment is summarized as follows. Health-care device 500 comprises acupoint work piece 200 having working end 204 for performing a pressing work on an acupoint of a body part of a user; and work body 190 on which acupoint work piece 200 is mounted for the user to align working end 204 with the acupoint, wherein the work body has reference center 196 and two symmetrical holes 192 symmetrically on both sides of the reference center.

Figure 9:
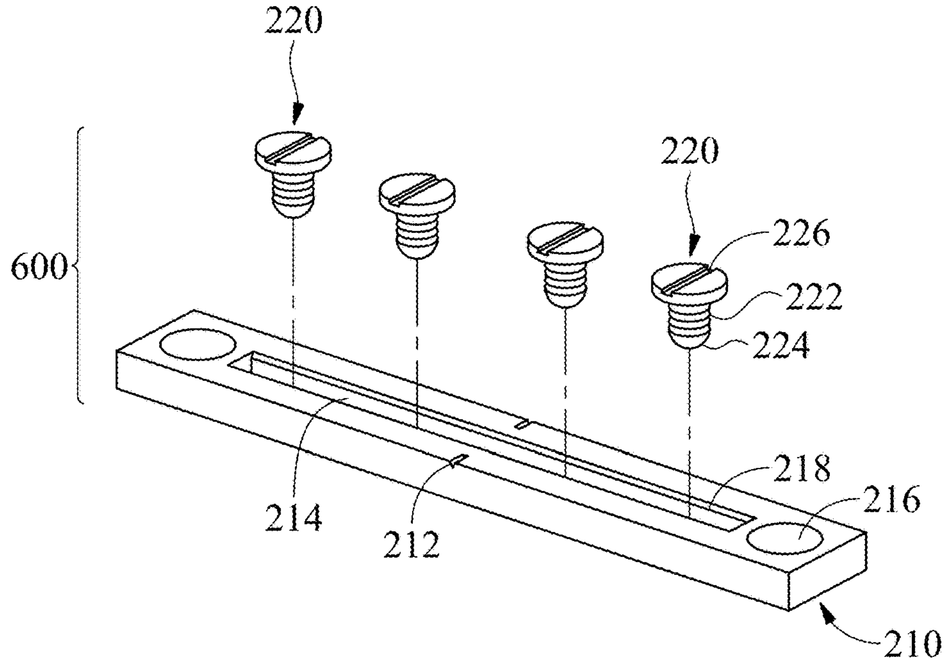
FIG. 9 is a sixth embodiment of the health-care device.

FIG. 9 is a sixth embodiment of a health-care device 600 of the present invention, comprising a plurality of acupoint work pieces 220, each having a working end 224 used to perform a pressing work on at least one acupoint of a body part of a user; and a work body 210, on which each acupoint work piece 220 is configured for the user to align working end 224 with the at least one acupoint, wherein acupoint work piece 220 has a threaded part 222 and working end 224 as in the preceding embodiments, and work body 210 has an actual or imaginary reference center 212, a hole slot 214, and a plurality of vent holes 216. Everyone has different body widths or specific body inches for acupuncture and moxibustion, so unless customized, the highest ideal should be to allow users to establish, according to their own body inches, screwed holes that are completely consistent with their own body inches. We know the concept of the so-called "self-tapping screw", that is, the diameter of threaded part 222 is slightly larger than the width of hole slot 214, so that the user can establish his own threaded hole according to his own body inches to perform the pressing work. In order to facilitate the user in establishing the required threaded hole, acupoint work piece 220 can be provided with a driver slot 226, and hole slot 214 can be provided with an inclined surface 218 on both sides of its upper end.

This embodiment is summarized as follows. Health-care device 600 comprises acupoint work piece 220 having working end 224 for performing a pressing work on an acupoint of a body part of a user; and work body 210 on which acupoint work piece 220 is mounted for the user to align working end 224 with the acupoint, wherein the work body has reference center 212 and hole slot 214.

A health-care device 600 as described in the preceding embodiments, wherein acupoint work piece 220 is configured with driver slot 226 and hole slot 214 has inclined surface 218 on both sides of an upper end of hole slot 214.

Figure 10:
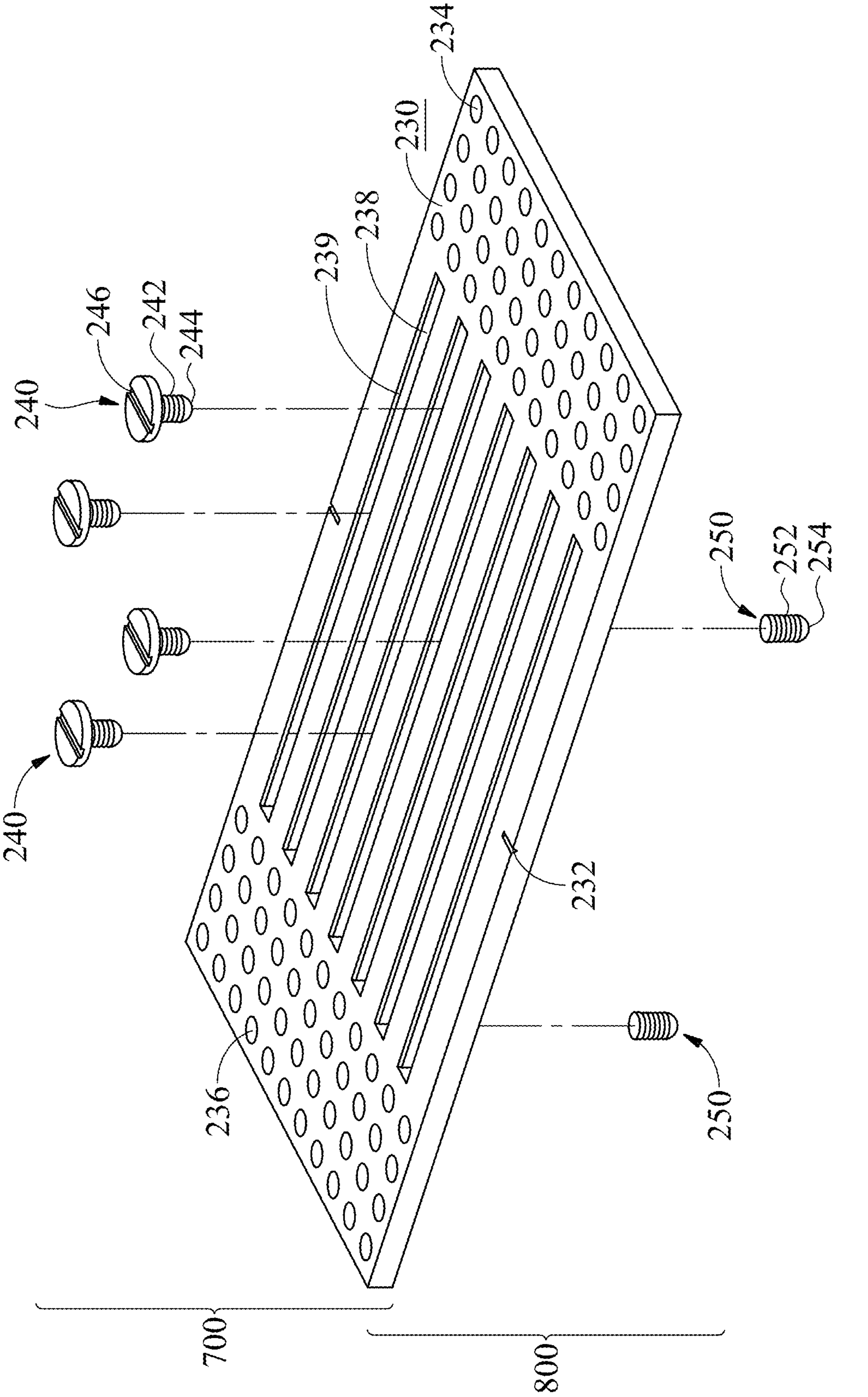
FIG. 10 shows a seventh embodiment and an eighth embodiment of the health-care device.

FIG. 10 is a seventh (and eighth) embodiment of a health-care device 700 (800) of the present invention, comprising a plurality of acupoint work pieces 240 (250) each having a working end 244 (254) for performing a pressing work on at least one acupoint of a body part of a user; and a work body 230 on which each acupoint work piece 240 (250) is configured for the user to align working end 244 (254) with the at least one acupoint, wherein acupoint work piece 240 (250) has a threaded part 242 (252) and working end 244 (254) as in the preceding embodiments, and work body 230 has a real or imaginary reference center 232, a plurality of hole slots 238 and a plurality of vent holes 234 and 236. Based on the concept of "self-tapping screw" above-mentioned, the diameter of threaded part 242 (252) is slightly larger than the width of hole slot 238, so a user can establish his own threaded hole according to his own body inches to perform the pressing work. As above-mentioned, in order to facilitate the user in establishing the required threaded hole, acupoint work piece 240 can be provided with a driver slot 246, and hole slot 238 can be provided with an inclined surface 239 on both sides of its upper end.

This embodiment is summarized as follows. Health-care device 700 (800) comprises acupoint work piece 240 (250) having working end 244 (254) for performing a pressing work on an acupoint of a body part of a user; and work body 230 on which acupoint work piece 240 (250) is mounted for the user to align working end 244 (254) with the acupoint, wherein the work body has reference center 232 and hole slot 238.

A health-care device 700 as described in the preceding embodiments, wherein acupoint work piece 240 is configured with driver slot 246 and hole slot 238 has inclined surface 239 on both sides of an upper end of hole slot 238.

Figure 11:
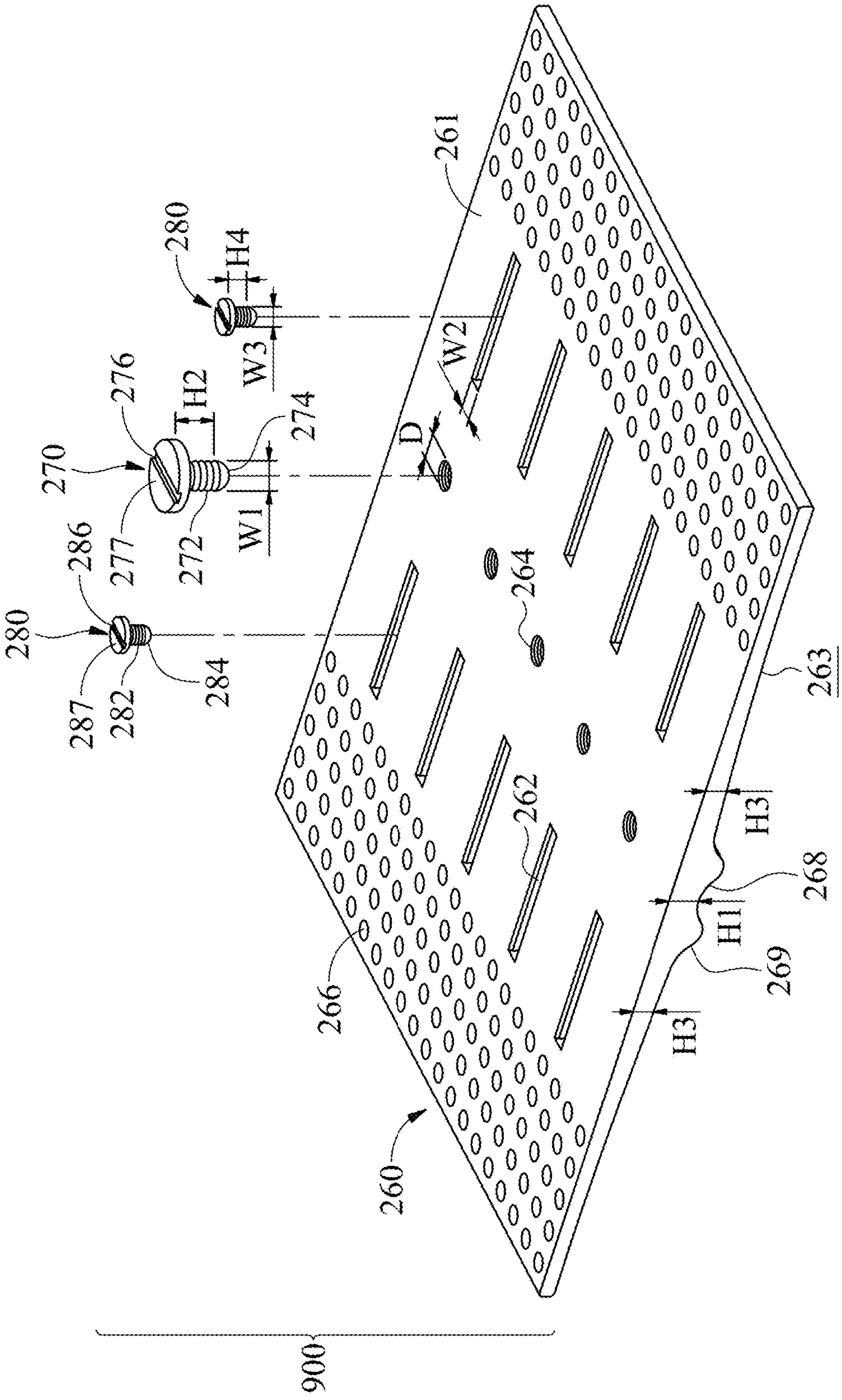
FIG. 11 is a ninth embodiment of the health-care device.

Please refer to FIG. 11. A ninth embodiment of a health-care device 900 according to the present invention comprises a work body 260 and a work piece 270 (280), wherein work body 260 is roughly in a shape of a plate, and has an upper surface 261, a lower surface 263, a plurality of central holes 264, and a plurality of vent holes 266. Lower surface 263 has a central recess 268 to conform to the back spine of a user, and a curved inclined area 269 to conform to a back curving surface of the user's back that extends from the spine to the scapula. A Governor Vessel work piece 270 (or Bladder Meridian work piece 280) has an operating part 277 (287) (which may have a driver slot 276 (286)) at its upper end, and a working rod having a working end 274 (284) and a threaded part 272 (282). The height H2 (H4) of threaded part 272 (282) (that is, the length extending from the bottom surface of operating part 277 (287) of work body 270 (280)) is slightly larger than the depth/height H1 (H3) of central screwed hole 264 (or the corresponding part of work body 260) to determine the extent beyond which working end 274 (284) protrudes from central screwed hole 264 (or the corresponding part of work body) after threaded part 272 (282) screws in central screwed hole 264. The principle is the same as that for FIG. 1, and will not be repeated here. In addition, the width W1 of threaded part 274 is equivalent to the diameter D of central screwed hole 264, and the width W2 of hole slot 262 is slightly smaller than the maximum diameter or width W3 of threaded part 282.

Figure 12:
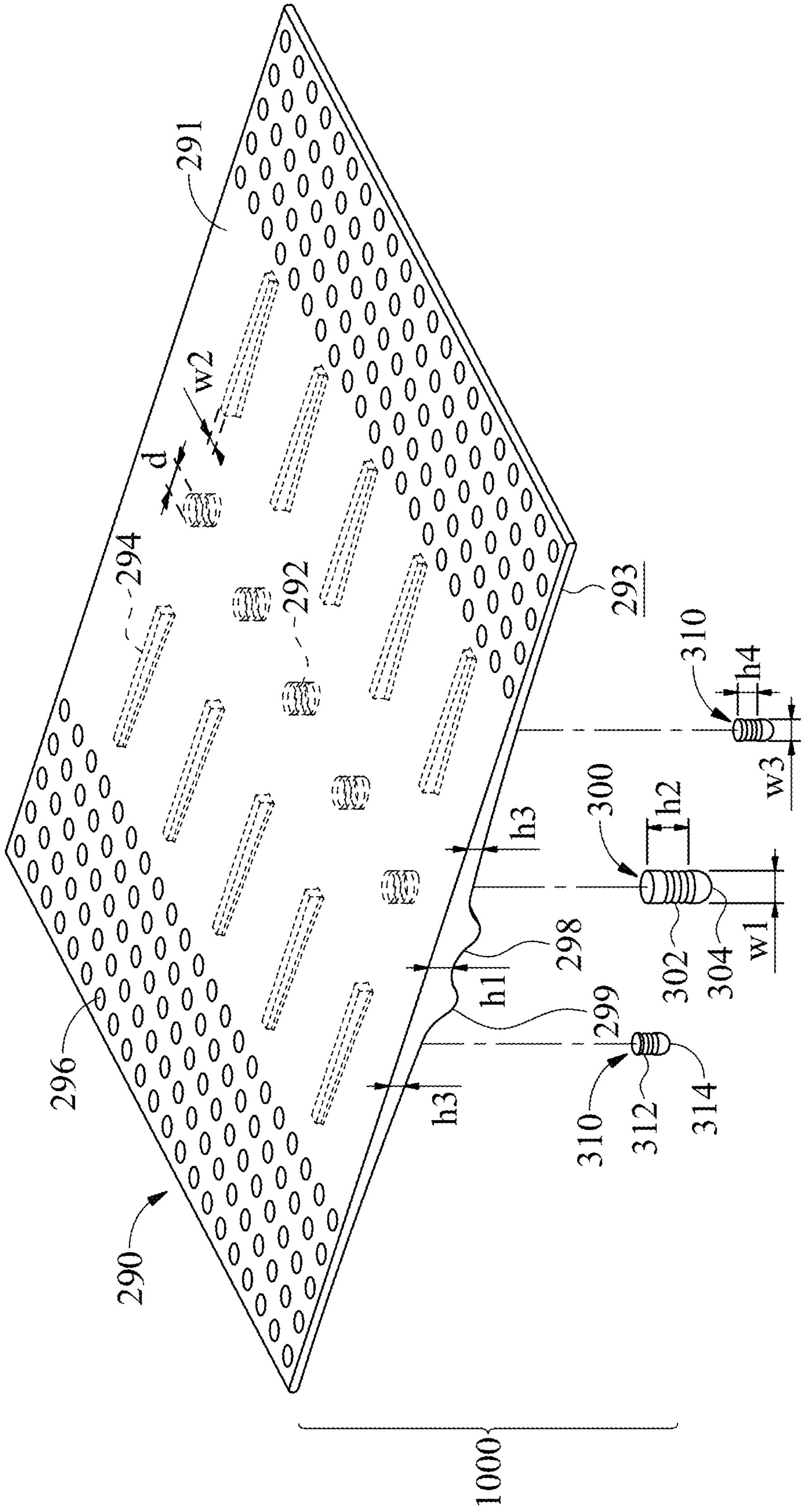
FIG. 12 is a tenth embodiment of the health-care device.

FIG. 12 shows a tenth embodiment of a health-care device 1000 according to the present invention comprising a work body 290 and a work piece 300 (310), wherein work body 290 is in a plate shape, and has an upper surface 291, a lower surface 293, a plurality of non-through central holes 292, and a plurality of vent holes 296, wherein the tops of central screwed holes 292 is non-through. Lower surface 293 has a central recess 298 to conform to the back spine of a user, and a curved inclined area 299 to conform to a back curving surface of the user's back that extends from the spine to the scapula. A Governor Vessel work piece 300 (or Bladder Meridian work piece 310) has a working end 304 (314) and a threaded part 302 (312). The height h2 (h4) of threaded part 302 (312) is slightly larger than the depth/height h1 (h3) of non-through central hole 292 of work body 290 (or the corresponding non-through part of work body), so as to determine the extent beyond which the working end 304 (314) protrudes from the blind central screwed hole 292 (or the non-through corresponding part of work body) after threaded part 302 (312) screws in the non-through central screwed holes 292. The principle is the same as that for FIG. 1, and will not be repeated here. In addition, the width w1 of threaded part 302 is equivalent to the diameter d of non-through central screwed hole 292, and the width w2 of non-through screwed hole slot 294 is slightly smaller than the maximum diameter or the width w3 of threaded part 312.

The corresponding parts of the preceding disclosed embodiments can be regarded as mutually replaceable parts for the embodiments, and some notes are added here. In this paragraph, health-care device 900 (1000) of the preceding two embodiments is summarized, comprising acupoint work piece 270 (280) (/300 (310)), and working end 274 (284) (/304 (314)) to perform a pressing work on an acupoint of a body part of a user; and work body 260 (290), on which acupoint work piece 270 (280) (/300 (310)) is configured for the user to align working end 274 (284) (/304 (314)) with the acupoint, so that a specific positional relationship between working end 274 (284) (/304 (314)) and the acupoint is maintained, wherein work body 260 (290) has a plurality of through central screwed holes 264 (non-through central screwed holes 292), and a plurality of symmetric hole slots 262 (294) that are either through or non-through.

Figure 13:
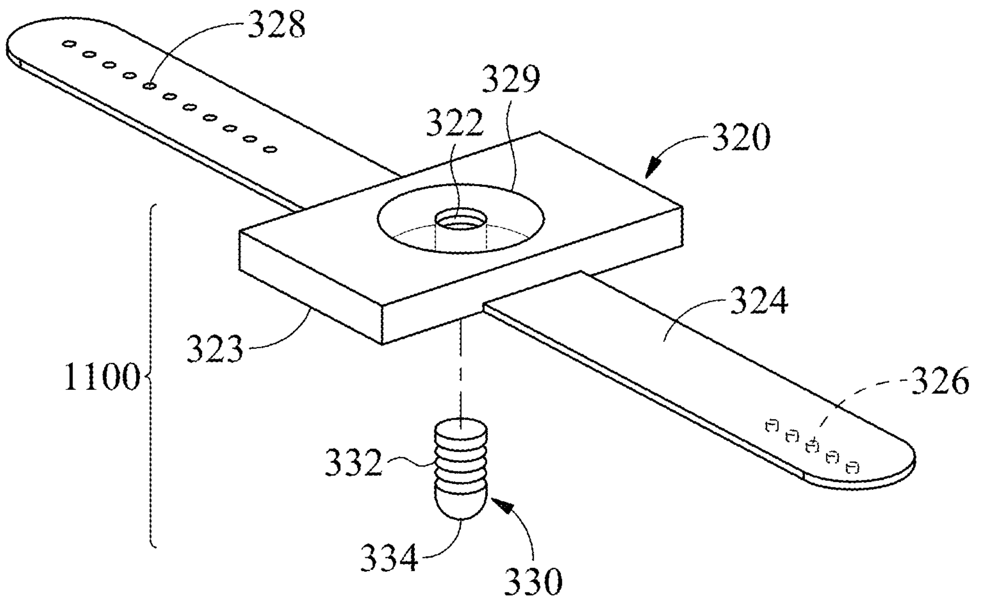
FIG. 13 is an eleventh embodiment of the health-care device.

FIG. 13 shows an eleventh embodiment of a health-care device 1100 according to the present invention comprising a work body 320 and a work piece 330 (310), wherein work body 320 has a central screwed hole 322, a bottom side 323, and wings 324 extending from bottom side 323 to both lateral sides. The right wing 324 has a plurality of bottom protrusion columns 326, and the left wing 324 has a plurality of recesses 328. Work piece 330 has a threaded part 332 and a working end 334. In use, left wing 324 is first wound around and attached to a side of a body part opposite to the side where the acupoint contacts, and then protrusion columns 326 at the end of right wing piece 324 is buckled into matching recesses 328 on left wing 324 such that working end 324 can press the acupoint with the optimum pressure. In detail, if you are assisted by others, two wings 324 are wound and attached as above-described after the acupoint is secured; and if you have no assistance from others, you can use working end 334 to temporarily align with the acupoint, temporarily loosely adjust two wings 324, and then adjust the alignment with the acupoint and tighten two wings 324, so that working end 334 exerts the most suitable pressure on the acupoint. For easy implementation, at least one peripheral area 329 outside of central hole 322 of work body 320 is transparent for the user to position the acupoint. Moreover, as long as they can be interlocked, protrusion columns 326 and recesses 328 can be changed to any suitable form, such as through or non-through fit, compression fit or tight fit, etc.

Health-care device 1100 above is summarized as follows. It 1100 comprises acupoint work piece 330 having working end 334 for performing a pressing work on an acupoint of a body part of a user; and work body 320, on which acupoint work piece 330 is configured for the user to align working end 334 with the acupoint, wherein work body 320 has two wings 324 extending from the bottom side, and two wings 324 are respectively provided with interlocking media 326, 328, which can be used to adjust a circumference formed by two wings 324 and surrounding the body part.

A health-care device 1100 as above-described, wherein bottom protrusion columns 326 are configured on one of wings 324, and recesses 328 are configured on the other wing 324, and work body 320 has a central transparent area.

The Chapter Nine-Needle Twelve-Origins in the Yellow Emperor's (Huangdi) Neijing Lingshu notes "[T]he name of the nine needles, each with a different shape. The first is called Cai needle, having a length of 1.6 (standard body) inches; the second is called Yuan needle, having a length of 1.6 (body) inches; the third is Di needle having a length of 3.5 inches; the fourth is the sharp needle having a length of 1.6 inches; the fifth is Pi needle having a length of 4 inches and a width of 0.25 inch; the sixth is Yuanli needle having a length of 1.6 inches; the seventh is the normally seen fine needle having a length of 3.6 inches; the eighth is the long needle having a length of seven inches; and the ninth is the big needle having a length of 4 inches. The Cai needle has a big head and a sharp end for draining the Yang Qi; the Yuan needle has an oval end for rubbing but not hurting the muscles for discharging the local qi; the Di needle is as sharp as a millet to press rather than invade into the meridian for invoking the qi; the sharp needle has a blade of three sides for treating chronic diseases; the Pi needle has the end like the edges of a sword to get rid of much pus; the Yuanli needle is round and sharp with the middle portion slightly larger for draining the violent qi; the fine needle is pointed like the beak of a mosquito or fly, by which it can quietly or slowly be acupunctured, and kept for a long time in the acupoint to get rid of pain and/or numbness; the long needle is sharp and thin body for coping with distant numbness; the big needle is pointed as a stiletto with the sharpness slightly rounded for discharging the water of an organ. All nine needles are thus complete." Of the nine needles, there are three types, i.e. Yuan, Di and big needles, which are not intrusive and are what the work piece of the present invention is intended to imitate.

Figure 14:
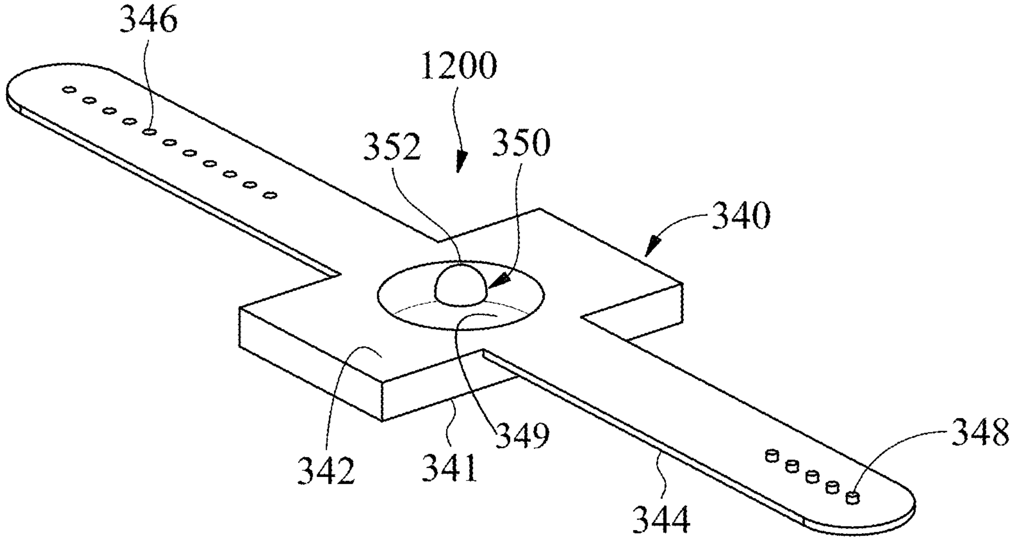
FIG. 14 is a twelfth embodiment of the health-care device.

FIG. 14 is a bottom view of a twelfth embodiment of a health-care device 1200 according to the present invention. The device 1200 comprises a work body 340 and a work piece 350, wherein work body 340 has a bottom side 342 and wings 344 extending from bottom side 342 to both lateral sides. The right wing 344 is configured with a plurality of bottom protrusions 348, and the left wing 344 is configured with a plurality of recesses 346. Work piece 350 is actually integrally formed on work body 340 and has a working end 352. The use situation is the same as the preceding embodiment, and will not be repeated here. Certainly, as above-mentioned, for easy operation, at least the central area 349 of work body 340 is transparent to facilitate the positioning of the acupoint by the user. Certainly, configuring or embedding practical objects, such as timers, or decorative objects, such as jewelry, on the upper surface 341 of work body 340 is obviously a feasible design choice.

Health-care device 1200 above is summarized as follows. Device 1200 comprises acupoint work piece 350 having working end 352 for performing a pressing work on an acupoint of a body part of a user; and work body 340 that is one-piece formed with acupoint work piece 350 for the user to align working end 352 with the acupoint, wherein work body 340 has two wings 344 extending from the bottom side, and two wings 324 are respectively provided with interlocking media 346, 348, which can be used to adjust a circumference formed by two wings 344 and surrounding the body part.

An embodiment as above-described, wherein a practical object or a decorative object is configured or embedded on upper surface 341 of work body 340.

Figure 15:
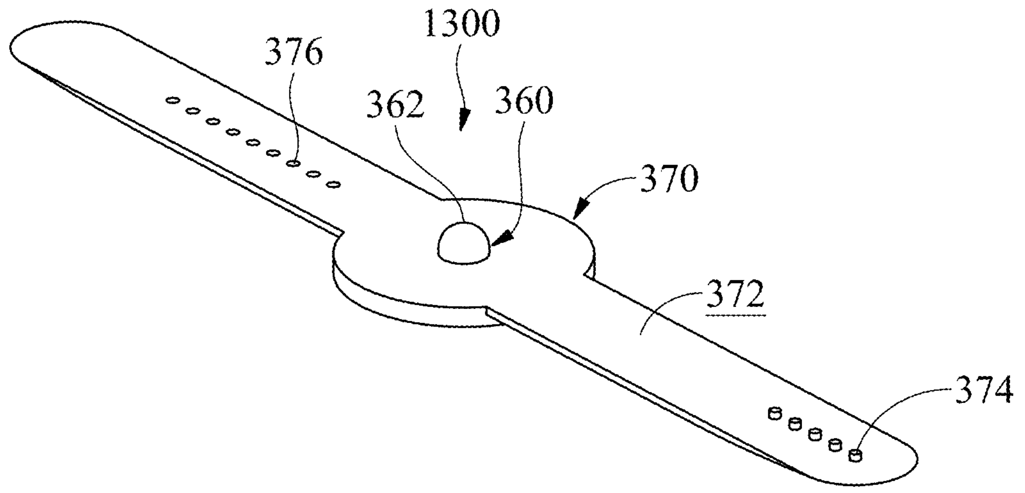
FIG. 15 is a thirteenth embodiment of the health-care device.

FIG. 15 shows a bottom view of a thirteenth embodiment of a health-care device 1300 according to the present invention. The thirteenth embodiment 1300 comprises a work body 370 and a work piece 360, wherein work body 370 has two wings 372 extending from the both sides of work body 370. The right wing 372 is configured with a plurality of bottom protrusions 374, and the left wing blade 372 is configured with a plurality of recesses 376. Actually, work piece 360 integrally formed on work body 370 has working end 362, and its use situation is the same as the preceding embodiments, so it will not be repeated here. The size of each piece (i.e., 360-372) in this picture varies with the using part (such as fingers, wrists, feet), and should be in line with the statistical value range for the body part of the public. In addition, most of the work bodies described in the preceding embodiments are made of relatively hard materials to facilitate the configurations of the central screwed hole or hole slot for cooperating firmly with the threaded part. As we know, there are many modern plastic materials. For large body parts, only wings 372 need to be flexible. That is, work body 370 other than wings 372 can be made of hard materials. However, in this embodiment, if it is intended to be used on the fingers, because of its small size, if entire work body 370 is flexible, it can be more adapted to the fingers/toes of each person, and more practical. If we want to use this embodiment on fingers/toes, the size of the embodiment should obviously be smaller; and if we want to use this embodiment on elbows or legs, its size should obviously be larger. In addition, work body 370 can be fully transparent, which is conducive to the user's confirmation of acupoints. See also the preceding descriptions, and it will not be repeated here.

Health-care device 1300 above is summarized as follows to comprise acupoint work piece 360 having working end 362 for performing a pressing work on an acupoint of a body part of a user; and work body 370 that is one-piece formed with acupoint work piece 360 for the user to align working end 362 with the acupoint, wherein work body 370 has two wings 372 extending from the both sides, and two wings 324 are respectively provided with interlocking media 374, 376, which can be used to adjust a circumference formed by two wings 372 and surrounding the body part.

A health-care device 1300 as described in the above embodiment, wherein work body 370 is flexible.

Figure 16:
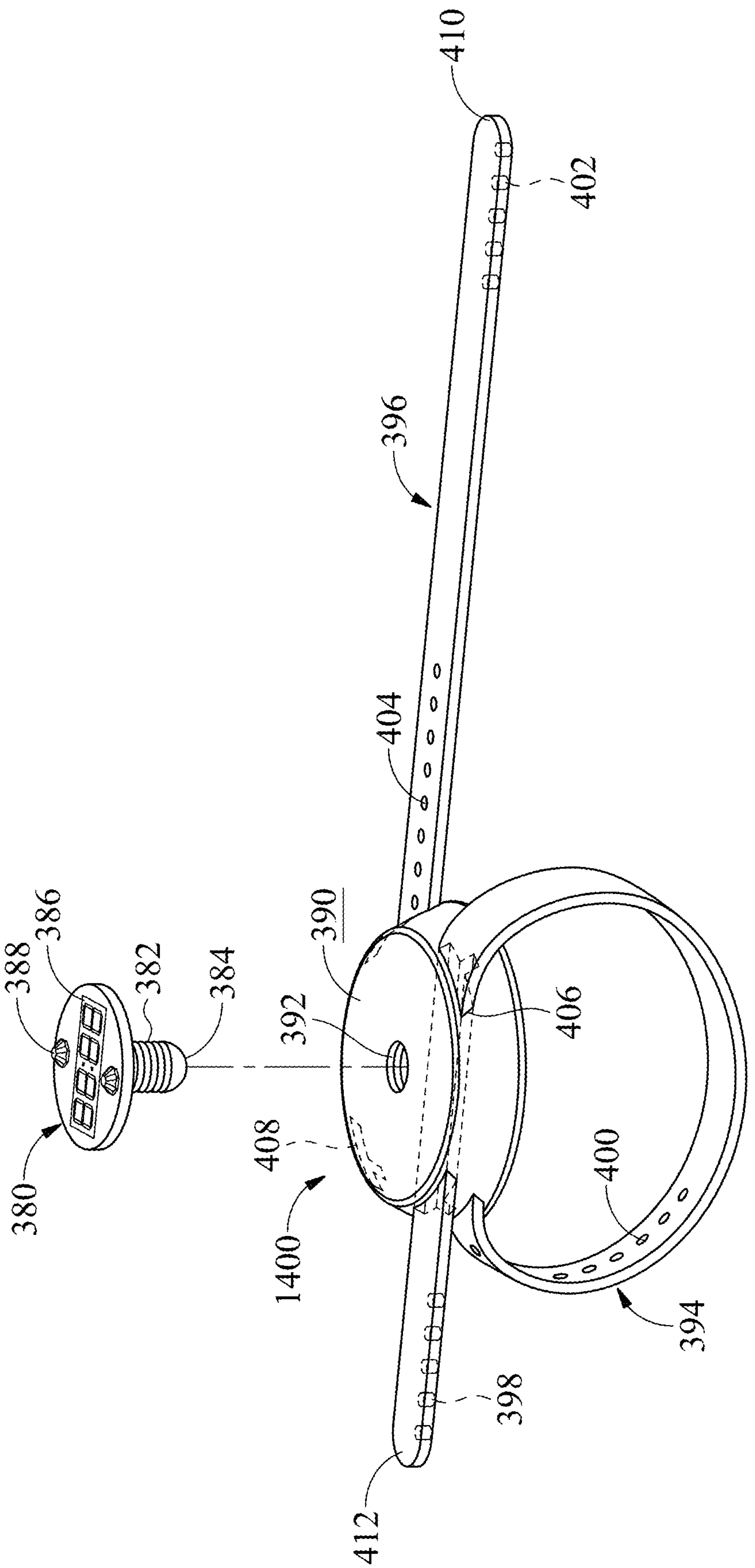
FIG. 16 is a fourteenth embodiment of the health-care device.

FIG. 16 shows a fourteenth embodiment of a health-care device 1400 according to the present invention, comprising a work body 390 and a work piece 380, wherein work body 390 includes a central screwed hole 392 and two wings 394/396 extending from the symmetrical two sides of work body 390. The right wing 396 is configured with a plurality of bottom protrusions 402 and a plurality of recesses 404 matching bottom protrusions 402. The left wing 394 has bottom protrusions 398 and recesses 400. In addition, work body 390 has two symmetrical transverse through grooves 406/408, so that the two free ends 410/412 of two wings 394/396 can respectively pass through them for self-locking. In this way, two wings 394/396 can adjust a circumference formed by two wings 394/396 and surrounding the body part, and the device position is achieved by interlocking protrusion columns/recesses 398/400 (402/404). Work body 390 can be completely transparent to facilitate the user to confirm acupoints. Work piece 380 includes a threaded part 382, a working end 384, a timer 386 and a jewel 388. As above-mentioned, upon using, pre-assembling wings 394/396 on work body 390, as shown by left wing blade 394, and pre-aligning work piece 380 with an acupoint of a specific body part, because work body 390 can be transparent, it is easy to identify the alignment status, and eventually, pressing work on the accurate acupoint is ensured. Certainly, the two wings 394/396 can be one-piece formed with work body 390. It is imaginable to use this wing design in the preceding embodiments.

Health-care device 1400 above is summarized as follows. Device 1400 comprises acupoint work piece 380 having working end 384 for performing a pressing work on an acupoint of a body part of a user; and work body 390 on which work piece 380 is configured for the user to align working end 384 with the acupoint, wherein work body 390 has two wings 372 symmetrically extending from the bottom side, work body 390 has two symmetrical transverse through grooves 406/408 to respectively pass therethrough the two free ends 410/412 of two wings 394/396 for self-locking, and two wings 394/396 are respectively configured with interlocking media 398/400, 402/404, which can be used to adjust a circumference formed by two wings 394/396 and surrounding the body part.

As far as the fingers and toes are concerned, due to many reasons such as their denseness, growth position or shape, etc., the embodiments above seem not very simple/easy for use. In addition, for the palms and feet, because of irregular changes in thickness along their longitudinal extension, and difficulties to find suitable locations along their two sides, it is not easy to position the aforementioned health-care device on any of these body parts, either from the top and bottom or from left to right. These problems have always occupied the mind of the Applicant. After hard research, there are supplements in the present application. The details are as follows.

Figure 17:
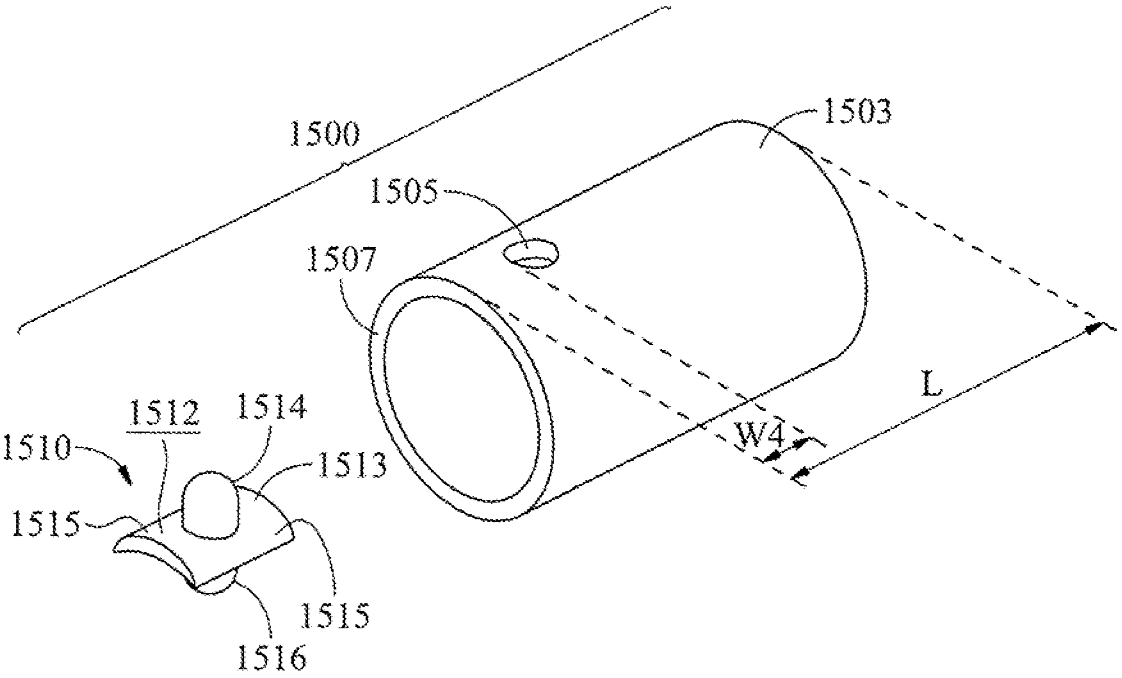
FIG. 17 is a fifteenth embodiment of the health-care device.

FIG. 17 shows a health-care device 1500 of a fifteenth embodiment of the present invention. Health-care device 1500 is used to care for fingers or toes, and comprises a sleeve-shaped body 1503 and an acupoint work piece 1510. Sleeve body 1503 is made of high-tension materials such as latex or silicone, and has a shrinkage capacity comparable to the radial pressure. Sleeve body 1503 has a radial through hole 1505, the distance between radial through hole 1505 and one end 1507 of sleeve body 1503 is W4, and sleeve body 1503 has a length L. Length L should be as short as possible under the condition of sufficient strength and easy use, and W4 should also be as short as possible, but sleeve body 1503 and radial through hole 1505 must have sufficient strengths. Acupoint work piece 1510 has a work body 1512, an upper connecting part 1514 and a lower working end 1516. Work body 1512 has a middle section 1513 and two side parts 1515, which can be one-piece formed. Alternatively, middle section 1513, upper connecting part 1514 and lower working end 1516 are made of a relatively harder first material, and two side parts 1515 are made of a relatively soft second material, which are integrated in the same manufacturing process.

This embodiment is mainly used in the acupoints at the end of fingers/toes, that is, the Shaoshang acupoint of the Lung Meridian, Shangyang and Erjian acupoints of Large Intestine Meridian, Lidui acupoint of Stomach Meridian, Yinbai acupoint of Spleen Meridian, Shaochong acupoint of Heart Meridian, Shaoze and Qiangu acupoints of Small Instestine Meridian, Zhiyin acupoint of Bladder Meridian, Zhongchong acupoint of Pericardium Meridian, Guanchong acupoint of Three Energizers (Sanjiao) Meridian, Touqiaoyin acupoint of Gallbaldder Meridian, and Dadun acupoint of Liver Meridian. The body parts on locations of these acupoints have thin skin and less flesh, so there will be an obvious feeling upon being pressed down only about 0.2 cm. If the right position is pressed, you will feel sore, numb and tingling. Even for a person with a plump body, it is not necessary to press down more than 0.5 cm. Therefore, we may divide working ends 1516 into three categories: light stimulation, moderate stimulation and heavy stimulation, with heights of about 0.15, 0.3 and 0.45 cm respectively. Considering the shear stress generated, W4 is preferably about 0.5 cm in size. Regarding L, if there is through hole 1505, L is preferably about 2 cm in length, and of course it can be 3 or 5 cm.

Figure 18:
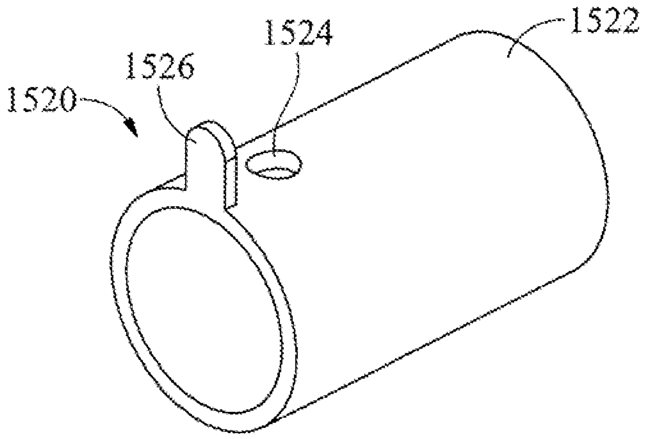
FIG. 18 is a seventeenth embodiment of the health-care device.

In use, sleeve body 1503 is configured on a finger/toe part to be worked, and after aligning through hole 1505 with the acupoint to be worked, acupoint work piece 1510 is inserted between sleeve body 1503 and the finger/toe, upper connecting part 1514 is positioned in through hole 1505, and the work preparation is completed. To facilitate this insertion action, please refer to another embodiment of the health-care device 1520 in FIG. 18, which is provided with a handle part 1526 on the sleeve body 1522 at a proper distance from a through hole 1524, so that the user applies force on the handle part to perform the insertion or work preparation above.

Figure 17A:
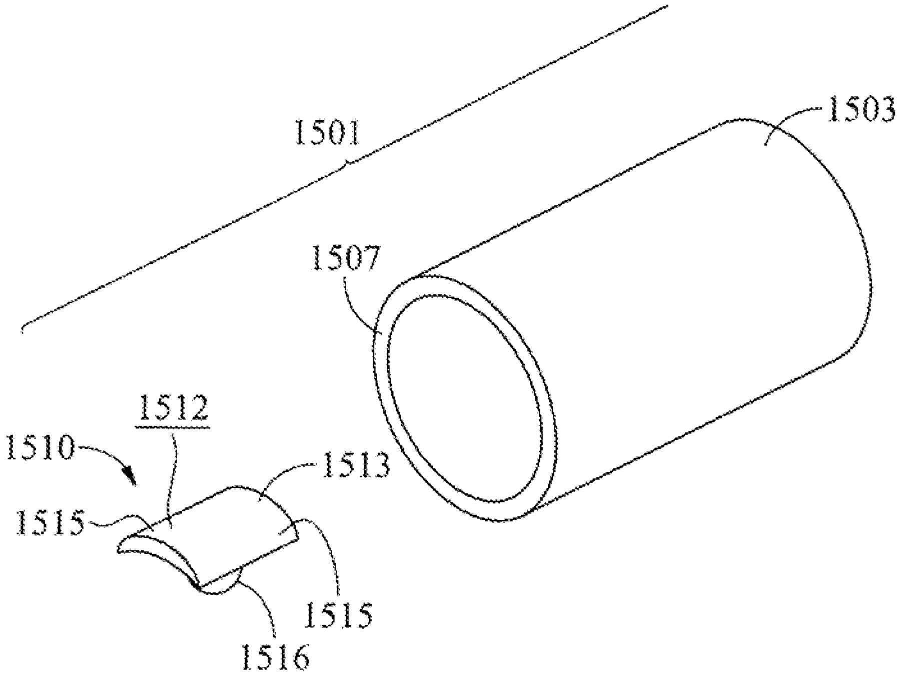
FIG. 17A is a sixteenth embodiment of the health-care device.

Please refer to FIG. 17A, which is another embodiment of another health-care device 1501, and its difference from health-care device 1500 in FIG. 17 is that it does not have through hole 1505 and upper connecting part 1514. Because of the strong radial contraction force of sleeve body 1503, work body 1512 is not easy to slip off even without the assistance of through hole 1505 and upper connecting part 1514.

A health-care device according to the preceding three embodiments is summarized as follows. The health-care device used to perform a health-care work on a finger/toe or a palm/foot of a user includes a sleeve covering the finger/toe or the palm/foot therein, and having a radial or inward contraction force, wherein the finger/toe or the palm/foot has an acupoint; and an acupoint work piece. The work piece has a working end for performing a health-care work on the acupoint; and a work body, on which the work end is mounted for the user to insert the acupoint work piece into a space between the sleeve and the finger/toe or the palm/foot for an alignment of the working end with the acupoint.

A health-care device according to the preceding embodiments, wherein the health-care work is a pressing work.

A health-care device according to the preceding embodiments, wherein the sleeve has a radial through hole, and the work body has a connecting part, wherein the connecting part and the working end are configured on opposite sides of the work body.

A health-care device according to the preceding embodiments, wherein the sleeve has an end and a handle part for the user to apply a force on the handle part to facilitate the insertion of the acupoint work piece into a space between the sleeve and the finger/toe or the palm/foot.

A health-care device according to the preceding embodiments, wherein the sleeve is made of a transparent and/or high-tension material, and the work body has a middle section and two side parts, wherein the middle section and the two side parts can be made of the same or different materials.

Figure 19:
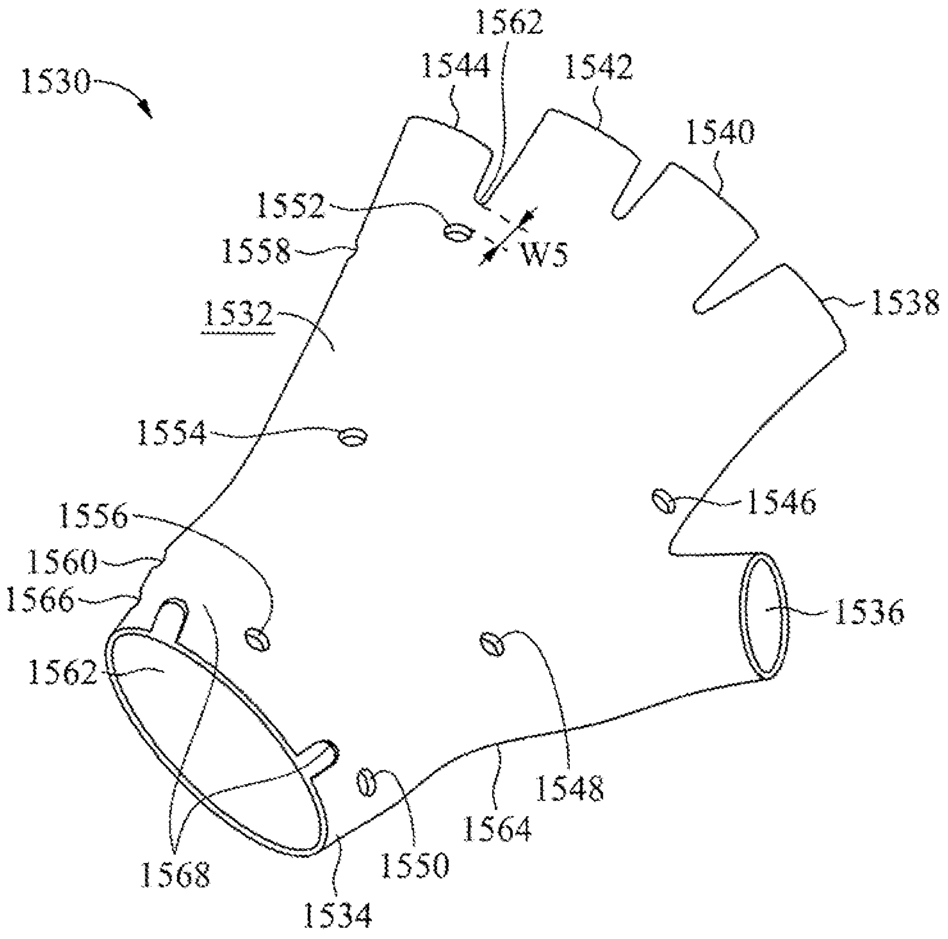
FIG. 19 is an eighteenth embodiment of the health-care device.

FIG. 19 shows a health-care device 1530 of an eighteenth embodiment of the present invention. Health-care device 1530 is used for acupoints of a palm of a user and comprises a palm body 1532 and a short wrist extension 1534. Palm body 1532 in a form of a glove is also made of high-tension materials such as latex or silicone, and has a contraction capacity comparable to the radial pressure. Palm body 1532 has a wrist opening 1562, a thumb opening 1536, an index finger opening 1538, a middle finger opening 1540, a ring finger opening 1542, a little finger opening 1544, and a plurality of corresponding acupoint openings 1546-1560. Because this figure shows the back of the palm with more acupoints, for the corresponding acupoint openings, only the acupoint openings corresponding to acupoints of Yang Meridians on the palm are shown. Acupoints of each Yang Meridian include Sanjian acupoint 1546 and Hegu acupoint 1548 of Large Intestine Meridian, Houxi acupoint 1558 and Wangu acupoint 1560 of Small Instestine Meridian, and Yemen acupoint 1552 and Zhongzhu acupoint 1554 of Sanjiao Meridian. Short wrist extension 1534 is designed for the purpose of configuring openings for the acupoints on the wrist, such as Taiyuan acupoint (not shown in the figure because it is on the dark side) and Yuji acupoint 1564 (only the position shown) of Lung Meridian, Yangchi acupoint 1556 of Sanjiao Meridian, Yangxi acupoint 1550 of Large Intestine Meridian, Shenmen acupoint (not shown in the figure because it is on the dark side) of Heart Meridian, and Yanggu acupoint 1566 (only the position shown) of Small Instestine Meridian. The little finger opening 1544 can be slightly extended (like short wrist extension 1534) to configure the opening corresponding to Qiangu acupoint of Small Instestine Meridian.

Because glove health-care device 1530 is made of high-tension materials, although the sizes of the human palms are quite different, only three to five sizes are needed for glove health-care device 1530, which can meet most requirements of people over the age of six, and in terms of the acupoint location, the error is within tolerable range. Similarly, since there are multiple openings 1536-1564 corresponding to the fingers and acupoints, palm body 1532 needs to be thick enough to have sufficient strength and required shear stress.

Health-care device 1530 of this embodiment can cooperate with acupoint work piece 1510 of the preceding embodiment by inserting acupoint work piece 1510 into a space between palm body 1532 and a palm of a user through relevant openings 1536-1544 and 1562. As in the preceding embodiment, the body part having these palm acupoints has thin skin and less flesh, so there will be an obvious feeling by pressing down only about 0.2 cm. If right position is pressed, you will feel sore, numb and tingling. Even for a person with a plump body, it is not necessary to press down more than 0.5 cm.

In order to facilitate the insertion of acupoint work piece 1510 into a space between palm body 1532 and the palm, and the positioning of upper connecting part 1514 at corresponding openings 1546-1560, handle parts 1568 each is configured at an appropriate position (such as the positions as shown in the figure and the joint 1562 between the ring finger and the little finger) on palm body 1532 with an appropriate distance from each corresponding opening, so that the user may apply a force on the handle part to perform the work preparation above.

It goes without saying that, the same as the preceding embodiment, health-care device 1530 here is not necessarily configured with corresponding openings 1546-1560 and upper connecting part 1514. Due to the strong retracting force of sleeve body 1532, work body 1512 is not easy to slip off even if there is no upper connecting part 1514 retained in the corresponding opening.

This embodiment is summarized as follows. A palm health-care device comprises an acupoint work piece having a working end for performing a health-care work on an acupoint of a palm part of a user; and a work body on which the working end is mounted for the user to align the working end with the acupoint; and a palm body to hold the acupoint work piece at the acupoint to perform the health-care work on the acupoint by the working end. The palm body includes a first end with five finger end openings for the five fingers of the palm part to pass therethrough, and a second end for the palm part to pass therethrough for fastening therewith a palm end of the palm part or the adjoining wrist.

A palm health-care device of the preceding embodiments, wherein the palm body is provided with a short wrist extension in a longitudinal direction at the second end.

A palm health-care device of the preceding embodiments, wherein a palm back and a palm front of the palm body are provided with a plurality of openings respectively corresponding to acupoints of three Hand Yang Meridians and three Hand Yin Meridians at the palm part.

A palm health-care device of the preceding embodiments, wherein the working end and the work body are one-piece formed, the acupoint work piece may further include a connecting part located on the opposite side of the working end, the palm body may be provided with an opening corresponding to the acupoint, the connecting part may match with the opening to position the working end to perform the health-care work, the palm body can be made of high-tension materials, such as silicone or latex, and/or the palm body can have at least one extended handle part, which has a specific distance from the palm body position corresponding to the acupoint, so that the user can apply a force to the handle part to put the acupoint work piece into the palm body.

Figure 20:
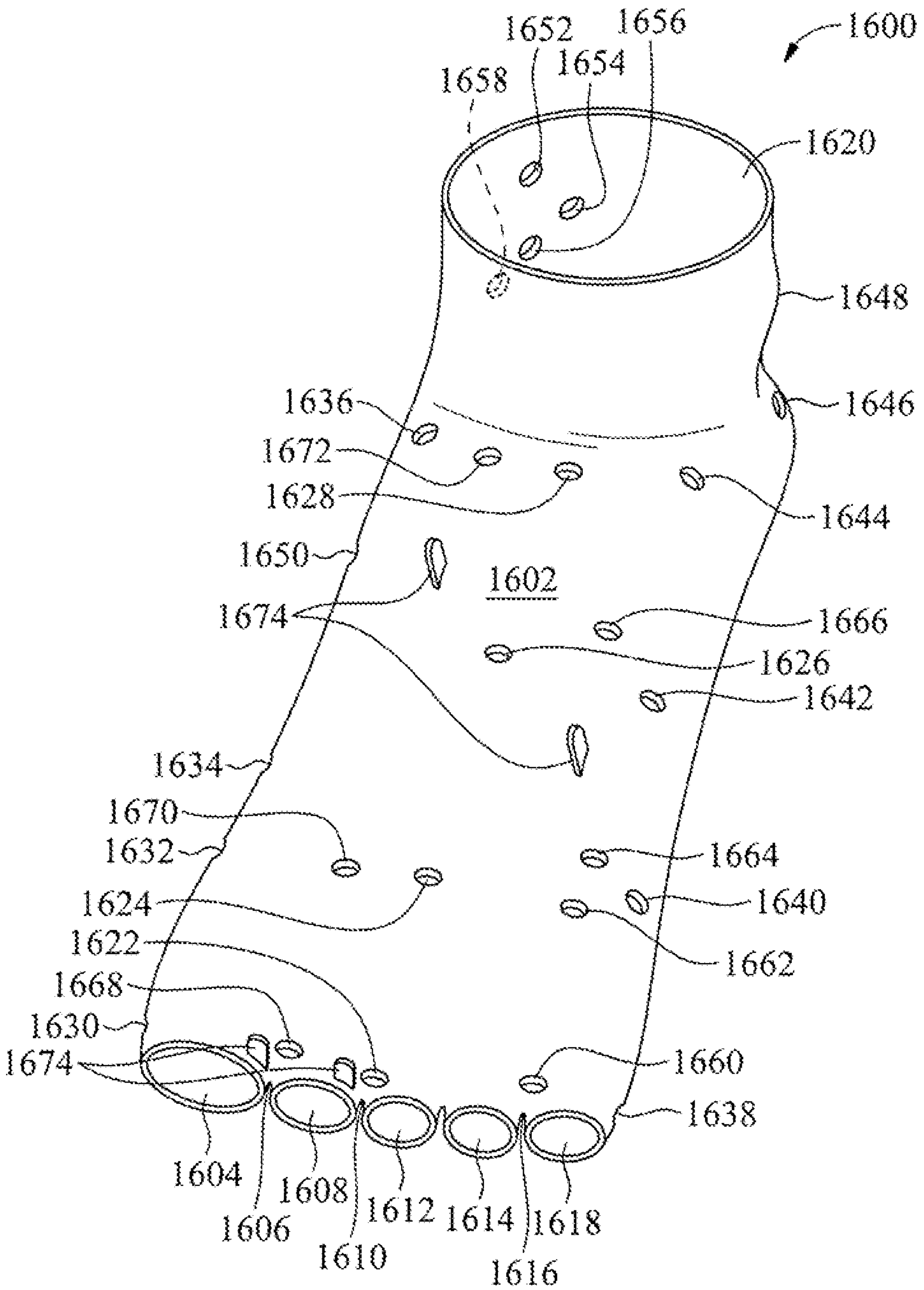
FIG. 20 is a nineteenth embodiment of the health-care device.

FIG. 20 shows a health-care device 1600 according to a nineteenth embodiment of the present invention. Health-care device 1600 is used for acupoints of a user's foot, and comprises a foot cover body 1602 and a short ankle extension 1620. Foot cover body 1602 is in a form of a foot cover, and is made of high-tension materials such as latex or silicone, and has a contraction capacity comparable to the radial pressure. Foot cover body 1602 has an ankle opening 1620, a thumb toe opening 1604, a thumb-index toe joint 1606, an index toe opening 1608, an index-middle toe joint 1610, a middle toe opening 1612, a fourth toe opening 1614, a fourth-little toe joint 1616, a little toe opening 1618, and a plurality of corresponding acupoint openings 1622-1672. Because this figure shows the instep with more acupoints, only the acupoint openings corresponding to acupoints of Yang Meridians and Yin Meridians on the instep part are shown. The acupoints of Yang Meridians and Yin Meridians include Neiting 1622, Xiangu 1624, Chongyang 1626 and Jiexi 1628 of Stomach Meridian, Dadu 1630 (wherein only the position is shown because it is on a side), Taibai 1632 (wherein only the position is shown because it is on a side), Gongsun 1634 (wherein only the position is shown because it is on a side) and Shangqiu 1636 of Spleen Meridian, Zutonggu 1638, Shugu 1640, Jinggu 1642, Shenmai 1644, Pucan 1646 and Kunlun 1648 (at the midpoint of the posterior edge of the lateral ankle and the anterior edge of the Achilles tendon) of Bladder Meridian, Yong Quan (on the dark side), Rangu 1650, Taixi 1652, Dazhong 1654, Shuiquan 1656 (only the position shown because it is out of sight), and Zhaohai 1658 (only the position shown because it is out of sight) of Kidney Meridian, Xiaxi 1660, Diwuhui 1662, Zulinqi 1664 and Qiuxu 1666 of Gallbaldder Meridian, and Xingjian 1668, Taichong 1670 and Zhongfeng 1672 of Liver Meridian. Short ankle extension 1620 is designed for the purpose that the plurality of acupoint openings for the acupoints located in the vicinity of the inner and outer ankles can be configured thereon, such as Kunlun 1648 of Bladder Meridian, and Taixi 1652, Dazhong 1654, Shuiquan 1656, and Zhaohai 1658 of Kidney Meridian.

Because foot cover health-care device 1600 is made of high-tension materials, although the sizes of human feet are quite different, only three to five sizes are needed, which can meet most requirements of people over the age of six, and in terms of the acupoint positioning, the error is within the tolerable range. Similarly, since there are multiple openings 1604, 1608, 1612, 1614, 1618 and 1622 to 1666 corresponding to the toes and acupoints, foot cover body 1602 needs be thick enough to have sufficient strength and required shear stress.

Health-care device 1600 of this embodiment can cooperate with acupoint work piece 1510 of the preceding embodiment by inserting acupoint work piece 1510 into a space between foot cover body 1602 and a user's foot through the relevant openings 1604, 1608, 1612, 1614, 1618 and 1620. As in the preceding embodiment, the foot part having the foot acupoints has thin skin and less flesh, so there will be an obvious feeling by pressing down only about 0.2 cm. If the right position is pressed, you will feel sore, numb and tingling. Even for a person with a plump body, it is not necessary to press down more than 0.5 cm.

In order to facilitate the insertion of acupoint work piece 1510 into a space between foot cover body 1602 and the foot and the positioning of upper connecting part 1514 at one of corresponding openings 1622-1666, handle parts 1672 each is configured at an appropriate position (such as the position between the thumb toe and the index toe or the position between the index toe and the middle toe as shown in the figure) on foot cover body 1602 with an appropriate distance from each corresponding opening, so that the user may apply a force on the handle part to perform the work preparation above.

It goes without saying that, the same as the preceding embodiment, health-care device 1600 of this embodiment is not necessarily configured with corresponding openings 1622-1666 and upper connecting part 1514. Due to the strong retracting force of foot cover body 1602, work body: 1512 is not easy to slip off even if there is no collaboration of upper connecting part 1514 and the corresponding opening.

This embodiment is summarized as follows. A foot health-care device comprises a foot health-care body, which has an ankle end for a user's foot to pass therethrough and a toe end with five toes openings for five toes of the foot passing through first the ankle end and then through the five toes openings respectively; and an acupoint work piece having a working end for performing a health-care work on an acupoint of the foot and a work body on which the working end is mounted for the user to align the working end with the acupoint to perform the health-care work.

A foot health-care device of the preceding embodiments, wherein the health-care work can be a pressing work, and the foot health-care body can be made of transparent and/or high-tension materials.

A foot health-care device of the preceding embodiments, wherein the foot health-care body is provided with a plurality of corresponding acupoint openings corresponding to a plurality of acupoints of three Foot Yang Meridians and three Foot Yin Meridian on an instep of the foot.

A foot health-care device of the preceding embodiments, wherein the ankle end has an extended length for configuring acupoint openings corresponding to the plurality of acupoints on the foot in the vicinity of the inner and outer ankles.

A foot health-care device of the preceding embodiments, wherein the foot health-care body further includes a plurality of handle parts, each configured at a foot health-care body position corresponding to and adjacent to an acupoint on the foot.

A foot health-care device of the preceding embodiments, wherein the acupoint work piece may further include a connecting part located on the opposite side of the working end, the foot health-care body may be provided with an opening corresponding to the acupoint, and the connecting part may match with the opening to position the working end to perform the health-care work.

Figure 21:
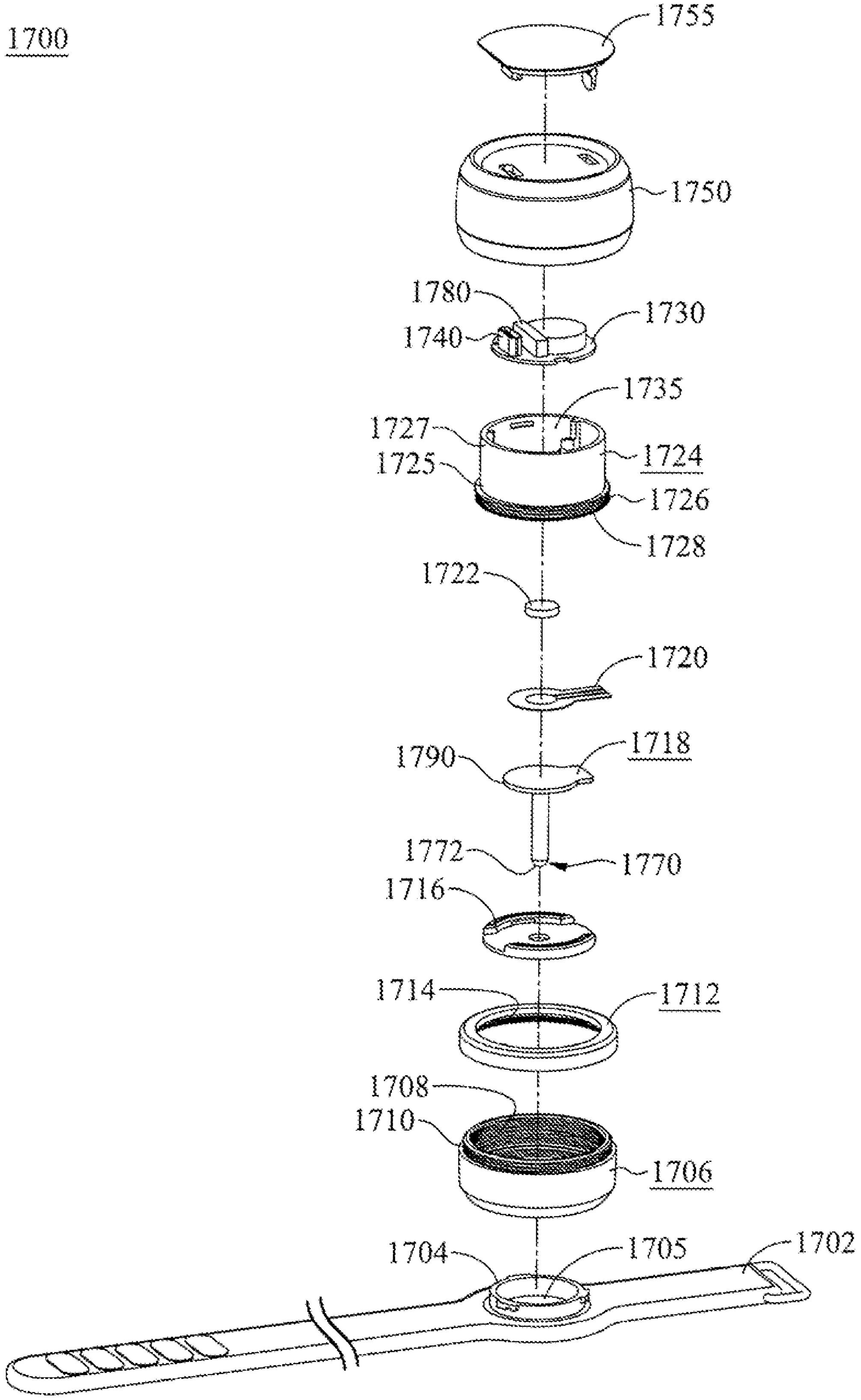
FIG. 21 is a twentieth embodiment of the health-care device.
Figure 21A:
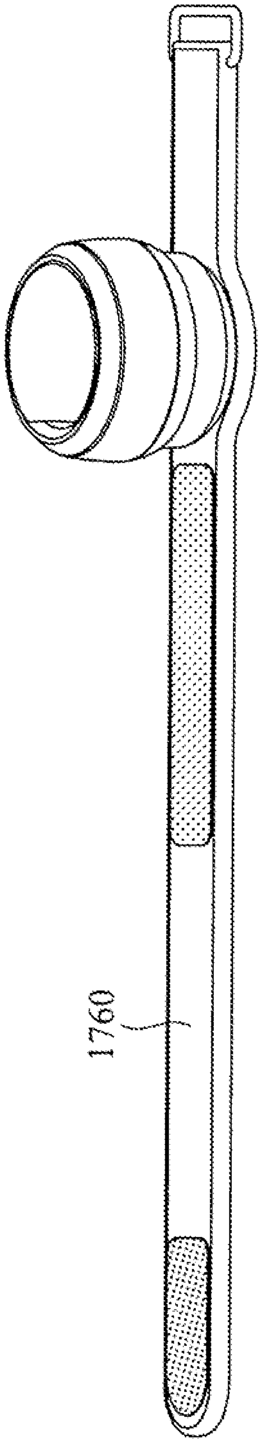
FIG. 21A is a twenty-first embodiment of the health-care device.

Please refer to FIG. 21, a further embodiment of the health-care device 1700 includes a flexible piece or a strap 1702, a bottom connecting piece or a bottom fastener 1704 connected to the strap 1702 and having a central opening 1705, a lower housing 1706 fastened to the bottom fastener 1704 and having an internal thread 1708 and an external thread 1710, a lower fastening piece 1712 having an internal thread 1714, an upper fastening piece 1716, a work piece 1718 having an operating end 1790 and an opposite working end 1770, a working level sensor 1720, a positioning piece 1722, an upper housing 1724 having an upper part 1727, a lower part 1725, an external thread 1726, a bottom surface 1728 and a containing space 1735, a circuit board 1730 electrically connected to the working level sensor 1720 to engage in sensing, a lithium battery 1780 configured on the circuit board 1730, a USB charging socket 1740 configured on the circuit board 1730 to charge the lithium battery 1780, an upper cover 1750 and a top cover 1755. The appearance of this assembly is shown in FIG. 21A showing that the Velcro fabric is used for a strap 1760.

Please refer back to FIG. 21. Upon assembling, circuit board 1730, lithium battery 1780, and USB charging socket 1740 are put into containing space 1735 first, and then work piece 1718, working level sensor 1720 and positioning piece 1722 are superimposed sequentially to be fastened to bottom surface 1728 via upper fastening piece 1716 to form a fastened component. Then, this fastened component is put into lower housing 1706 for protruding downward working end 1770. When external thread 1710 of lower housing 1706 and internal thread 1714 of lower fastening piece 1712 thread together, lower fastening piece 1712 locks the fastened component and lower housing 1706 together. Because a diameter of the flange forming external thread 1726 on upper housing (work body) 1724 is smaller than a smallest diameter of lower fastening piece 1712, the fastened component, in the non-working state, cannot escape the restraint of lower fastening piece 1712. When we cover or buckle the outer cover 1750 to the fastened component, it will appear like the health-care device of FIG. 21A. As above-mentioned, flexible piece 1760 of FIG. 21A uses a self-fastening medium.

In use, a center of bottom fastener 1704 or central opening 1705 is aligned with an acupoint first, then strap 1702 is fastened to a desired body part such that the acupoint and bottom fastener 1704 are in a concentric relationship, and device body 1706 is fastened or attached to bottom fastener 1704 afterwards. When we rotate outer cover 1750 (together with upper housing 1724), working end 1770 (having a tip 1772) goes down. The work style of working end 1770 can be various. For example, it can cause the working level sensor to sense a pressure, a temperature, or a depth etc. In the embodiment of FIG. 21, we assume that working level sensor 1720 is a pressure sensor or a temperature sensor, and the circuit board senses its relevant parameters of pressure or temperature and transmits an original signal, a converted signal or a computed signal. The so-called original signal, for example, is a pressure or a depth. The so-called converted signal or the computed signal, for example, can be a work intensity (such as an exposure intensity or a stimulus intensity) or a work performance (such as the particle number released). It is better to explain here that to facilitate a user to align bottom fastener 1704 or central opening 1705 with a specific body part or a specific acupoint, a total height of bottom fastener 1704 is preferably controlled in a range between 10% and 35% of a total height of health-care device 1700 under a non-operating state.

This embodiment is summarized as follows. Health-care device 1700 comprises device body 1706; a work piece having an operating end and an opposite working end, wherein the working end is used to engage in a health-care work towards a specific part or an acupoint of a body part of a user; work body 1724 connected to the device body and mounts the operating end on its lower part so that through the operating operating end or the work body, the user maintains a specific working relationship between the working end and the specific part or the acupoint; and a device positioning piece (such as a flexible piece) connecting the device body to position the device body on the body part such that a specific positional relationship between the working end and the specific part or the acupoint is maintained.

A health-care device according to the preceding embodiments, wherein the device body has a bottom fastener and a lower housing, and the lower housing has a central opening to pass therethrough the working end and engages with the bottom fastener; and/or the work body is an upper housing engaging with the device body, so that when the working end and the acupoint maintain the specific working relationship, the health-care work is performed on the acupoint by the work piece. The so-called specific positional relationship, for example, is a pressing, a thermal stimulation, an electrical stimulation, or a light stimulation etc. Such specific positional relationship usually represents a work intensity of the health-care work, an extent that the working end or its tip approaches or touches the specific part or the acupoint of the body part, or an orientation relationship between each other.

A health-care device according to the preceding embodiments, further comprises: a bottom fastener combined to (such as sewed on) the flexible piece, a lower housing fastened to the bottom fastener (such as by a buckle method) and having an external thread; and a lower fastening piece having an internal thread screwedly engaging with the external thread, wherein the lower fastening piece has a minimum inner diameter, the work body has a characteristic maximum outer diameter, and the minimum inner diameter is smaller than the characteristic maximum outer diameter; and/or a working level sensor, a circuit board electrically connected to the working level sensor, a lithium battery electrically connected to the circuit board, a USB charging socket electrically connected to the circuit board, an upper housing for accommodating the circuit board, the lithium battery and the USB charging socket, an assistant positioning piece (such as a pad) for assisting in positioning the working level sensor, and an upper fastening piece to fasten the work piece, the working level sensor and the assistant positioning piece to a bottom of the upper housing (such as by a buckle method) and protrude the working end downward from the upper fastening piece.

To understand the content that the working mode can be various means, we use “moxibustion” as an example here to explain the practical use of the present invention. Upon investigation of the material of traditional Chinese moxibustion, moxa, its ingredients are found to include volatile oil, flavonoids, tannins, polysaccharide and trace pieces (iron, calcium and phosphorus), so that special effects can be obtained. However, moxibustion should be performed by a Chinese physician or a nurse to prevent a patient from being scalded, and thus is inconvenient. Further, after infrared was discovered by the scientist William Herschel when he used the prism to study the thermal effect of spectrum in 1800, it is widely used in related medical care or rehabilitation. It can be further divided into near infrared, middle infrared and far infrared, and the wavelengths released by the infrared medical equipment are all in the range of the far infrared. The far infrared can have the effects on the organism of: generating a warm effect, promoting a blood circulation, improving a poor microvascular circulation, promoting a tissue growth and promoting a tissue regeneration. Thus, the far infrared not only can promote the growth and development of organisms, but also can be used as auxiliary treatment tools such as alleviating the pain of the wound, promoting the wound healing, activating a blood stasis, promoting the healing of diabetic foot ulcer, treating a high blood pressure and relieving mental stress etc. Recently, there is an academic research disclosing that the far infrared having the wavelength of 4-14 μm is a fertility light, tourmaline is a natural ore releasing far Infrared and negative ions continuously, magnesioferrite crystal contained in the tourmaline is the key of releasing the far infrared, and there are materials synthesized by natural ores that release this far infrared. Even with this material, its inconvenience in use has no difference from that of the traditional acupuncture or moxibustion.

Further, the human body contains 70% water and 80% of blood is water. In addition, one of resonant wavelengths of the water is 6.27 μm. Although the red infrared has a wide range (0.78-1000 μm), only 4-14 μm of the light of life cover the resonant wavelength of water, can trigger the resonance of water molecules, and crack big water molecular clusters into small water molecules for easy human body absorption. Still more, the human body comprises carbohydrate, the resonant wavelengths of C—H chain, C—C chain and C—O chain are all in the range of the light of life, and thus the wavelength of 4-14 μm can go deep into the capillaries via the human body molecular resonance so as to speed up the blood flow. After this introduction, the moxibustion and the far infrared both are desirable. However, to put them in use at low cost and with convenience, the present invention is indispensable, as described as follows.

Figures 22, 22A, 22B:
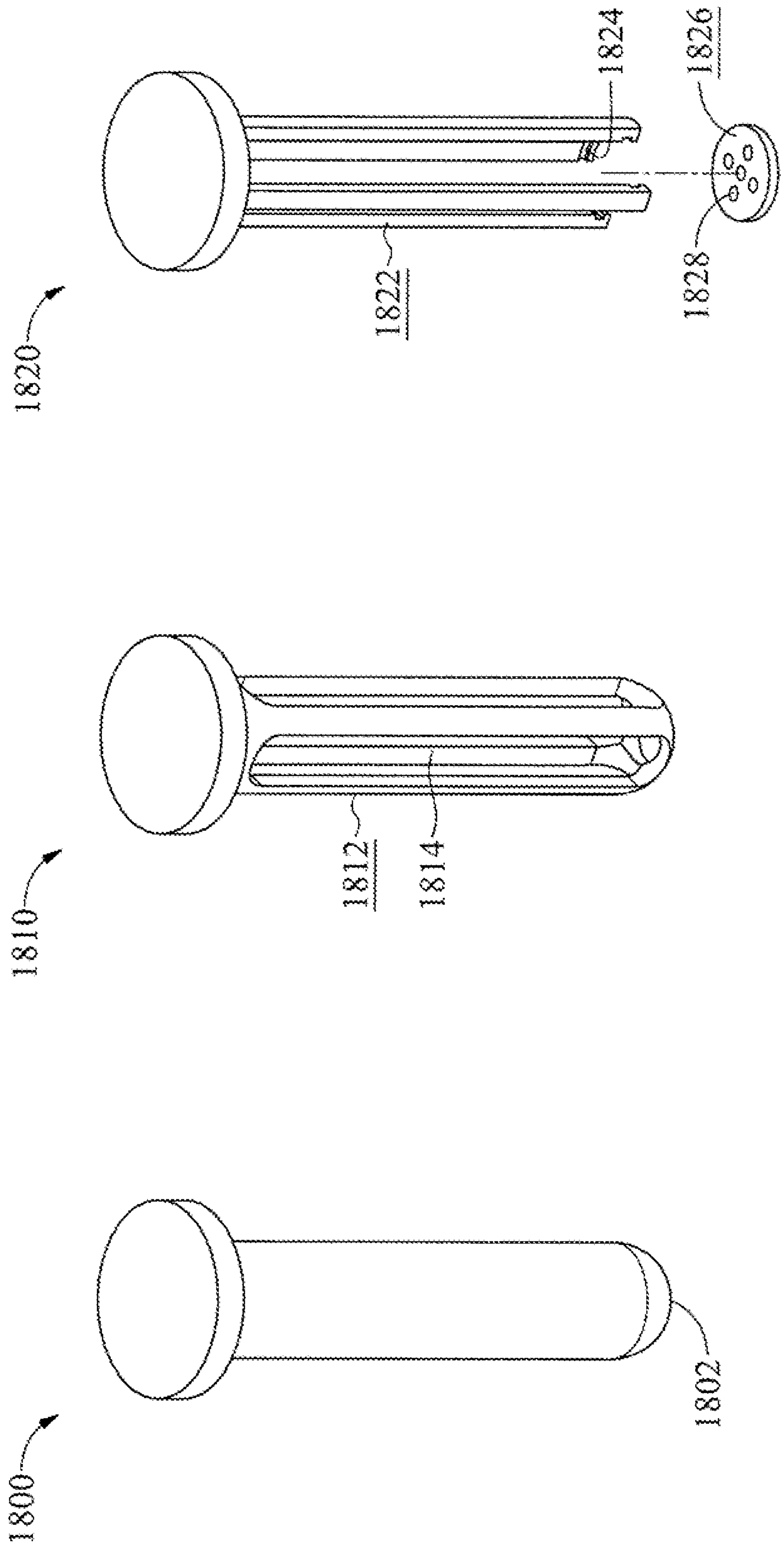
FIG. 22 is a first embodiment of the acupoint work piece in a twenty-second embodiment of the health-care device.
FIG. 22A is a second embodiment of the acupoint work piece in the twenty-second embodiment of the health-care device.
FIG. 22B is a third embodiment of the acupoint work piece in the twenty-second embodiment of the health-care device.

Please refer to FIG. 22, which is a first embodiment of an acupoint work piece 1800 of a twenty-second embodiment of the health-care device, wherein the acupoint work piece has a work front 1802. Acupoint work piece 1800 is molded with materials that come from natural minerals and can emit far infrared rays. Replacing acupoint work piece in FIG. 21 with acupoint work piece 1800, obviously it can perform the far infrared care in a simple and yet low-cost way. Please refer back to the embodiment in FIG. 21, through the extent that external thread part 1726 is screwed downward along internal thread 1708, we can assure a distance between work front 1802 and the acupoint or the skin surface to be health-cared, and adjust or set the relevant working parameters according to this distance.

Please refer to FIG. 22A, which is a second embodiment of an acupoint work piece 1810 of the twenty-second embodiment of the health-care device, wherein there are a plurality of longitudinal grooves 1814, through which, not only the far infrared releasing material can be saved, but also the moxa can be put into longitudinal grooves 1814 so as to obtain the dual effects. Please refer to FIG. 22B, which shows a third embodiment of an acupoint work piece 1820 of the twenty-second embodiment of the health-care device, wherein the acupoint work piece body 1822 in this embodiment includes four circularly arranged rectangular columns, each of which has a recess 1824 retaining thereby a far infrared releasing cake 1826 serving as the working end. Cake 1826 is provided with a plurality of openings 1828, on which the moxa can be disposed and by which the essence caused by burning the moxa can be penetrated into the skin as expected by a traditional moxibustion.

Figure 23:
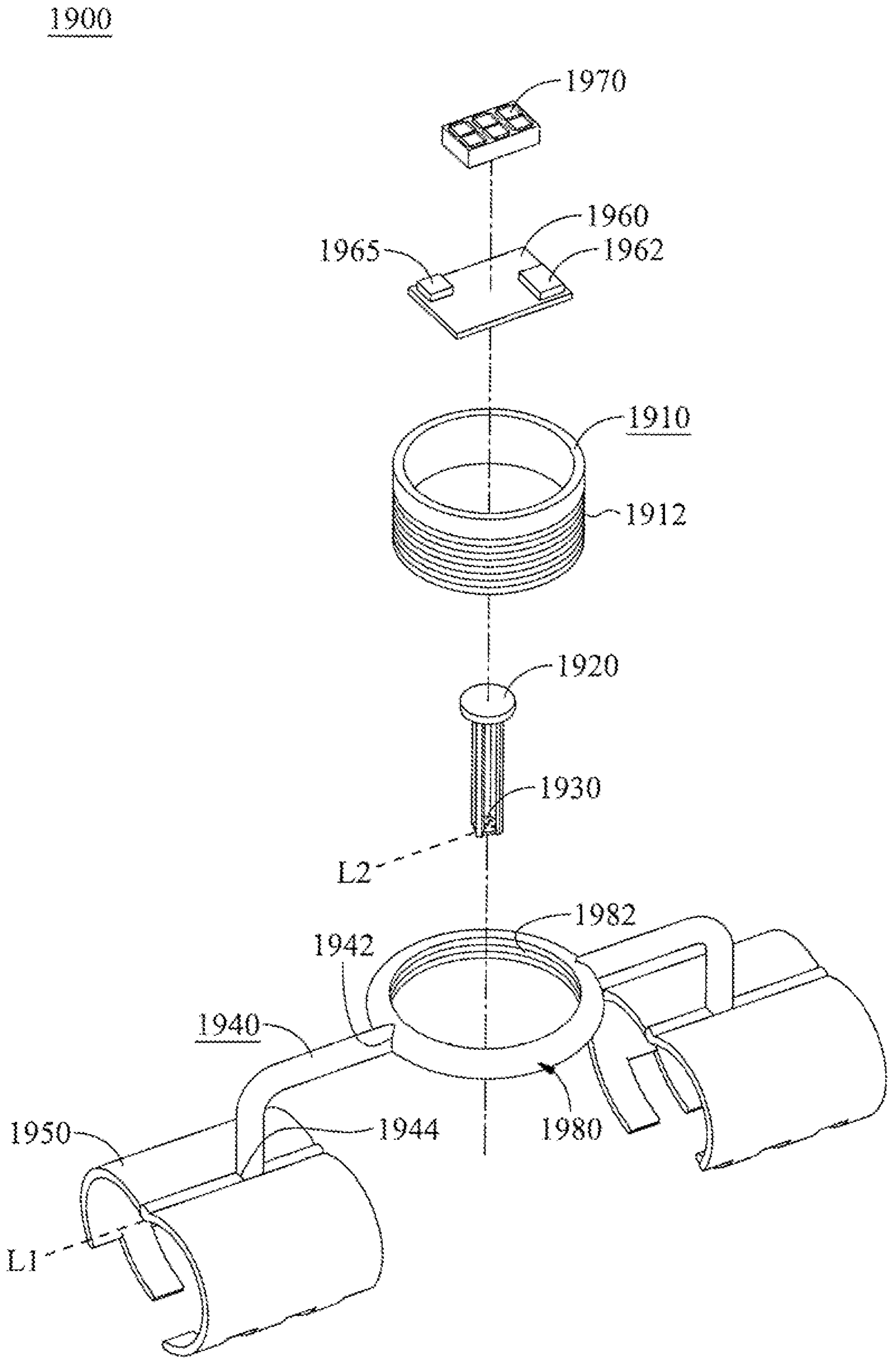
FIG. 23 is a twenty-third embodiment of the health-care device.

Usually, the highest contact temperature the human skin can stand without harm is 45 degrees Celsius. At 53 degrees Celsius, it is very likely that you will get burned after one minute. When the burning moxa contacts the skin, it must cause a scald, and that is one of the reasons why acupuncture is more popular than the moxibustion. Via circuit board 1730 and a precisely controlled working distance between work front 1802 and the skin of the body part, not only we can avoid contact burn, but also the working temperature of cake 1826 can be increased by keeping the working distance. The higher the working temperature is, the more the far infrared is released by cake 1826, and thus the healing effect is increased. Certainly, under this embodiment, the structure can be different from the above-mentioned examples. As shown in FIG. 23, which is a twenty-third embodiment of a health-care device 1900 including a work body 1910 having an external thread 1912, a work piece 1920 retaining at its end a far infrared cake 1930, one or a pair of device positioning pieces 1940, a circuit board 1960, a heating device 1962, a heating controller 1965, a circular connector 1980 having an internal thread 1982, and a heating extent display 1970. Each device positioning piece 1940 has a first terminal 1942 connected to circular connector 1980, and connected to work body 1910 via screwedly engaging internal thread 1982 of circular connector 1980 with external thread 1912. Each device positioning piece 1940 has a second terminal 1944 connected to an elastic limb retainer 1950. The level at which limb retainer 1950 contacts the limb skin is L1, and the level at the bottom of work piece is L2. We can control a distance between L1 and L2 easily, for example, to be 2 mm or 1 cm, and then define the working style of work piece 1920. Having gone through the explanations of so many embodiments, further explanations of more details should thus be redundant.

It is worth mentioning that in the embodiment of FIG. 23, because work piece 1920 is only required to be secured to work body 1910 (equivalent to the work body or upper housing 1724 in FIG. 21), the device body being lower housing 1706 in FIG. 21 can be omitted. For another aspect, in this circumstance the device body and work body 1910 are one-piece formed.

Figure 24:
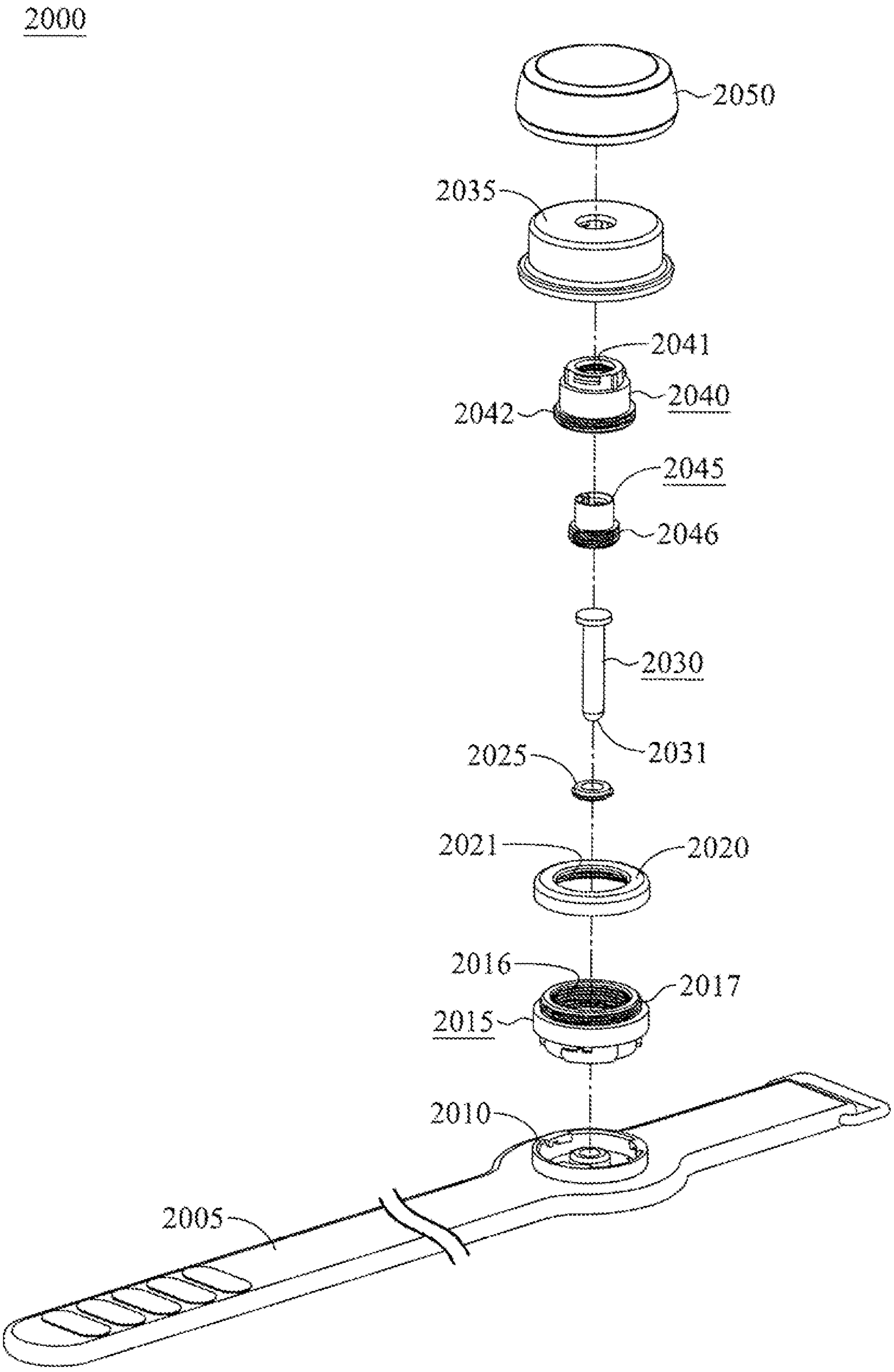
FIG. 24 is a twenty-fourth embodiment of the health-care device.
Figure 24A:
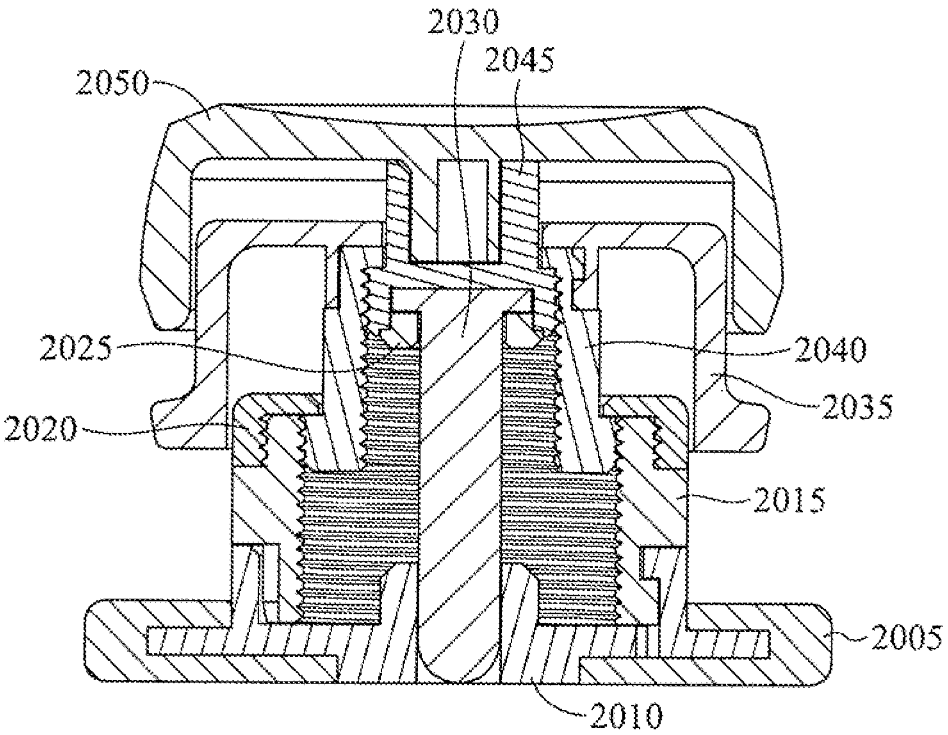
FIG. 24A is a cross-sectional view of the twenty-fourth embodiment of the health-care device.

Please refer to FIG. 24, which is a twenty-fourth embodiment of the health-care device 2000. FIG. 24A is a cross-sectional view to help quickly understand its structure. For this structure, it is assumed that the two-phase working depth is an ideal practice method of the present invention, and its principle is applicable no matter whether it is in contact with the skin or non-contact with the skin (which only requires a slight modification of the structure of the bottom connecting piece). The non-contact type is, for example, to adjust the distance between the working front and the skin, while the contact type is, for example, to adjust the pressing depth or pressure of the working end on the skin. In detail, the health-care device comprises a flexible piece or a device positioning piece 2005, a bottom connecting piece or a bottom fastener 2010 combined with the flexible piece 2005, a housing 2015 fastened to the bottom fastener 2010 and having an internal thread 2016 and an external thread 2017, a fastening piece 2020 having an internal thread 2021, a positioning piece 2025, a work piece 2030 having a working end 2031, a first phase operating medium 2035, a first phase working end driving medium 2040 having an internal thread 2041 and an external thread 2042, and connected to first phase operating medium 2035, with external thread 2042 screwedly engaging with internal thread 2016 to rest the working end 2031 at a first phase working level position, an upper cover 2050, and a second phase working end driving medium 2045 having an external thread 2046 screwedly engaging with internal thread 2041 and passing upward through first phase operating medium 2035 to be fastened to upper cover 2050.

When assembling, second phase working end driving medium 2045 is screwed to first phase working end driving medium 2040 to a greatest extent, work piece 2030 is positioned at a bottom of second phase working end driving medium 2045 by positioning piece 2025, then this assembly is positioned or placed into the containing space of housing 2015, and after external thread 2042 and internal thread 2016 have a basic screw connection, this assembly is securely buckled to housing 2015 by screwedly engaging internal thread 2021 of fastening piece 2020 with external thread 2017. Then the assembly of the body of health-care device 2000 is completed by buckling first phase operating medium 2035 to first phase working end driving medium 2040, and buckling upper cover 2050 to second phase working end driving medium 2045 respectively. After this assembly of the body is fastened to bottom fastener 2010, it can start to work. Regarding various buckles mentioned here, because they can be achieved by many implementation methods in light of the present invention, which can be easily thought of by those skilled in the art, they are not described here in detail. It is worth mentioning that upper cover 2050 constitutes the working medium for operating second phase working end driving medium 2045.

In use, a center of the bottom connecting piece or bottom fastener 2010 is aligned with an acupoint first, then device positioning piece 2005 is fastened to a desired body part such that the acupoint and bottom fastener 2010 are in a concentric relationship, and the assembly of the body is fastened to bottom fastener 2010 afterwards. When we operate first phase operating medium 2035 (together with first phase working end driving medium 2040), working end 2031 will go downward. The work style of working end 2031 can be various, for example, it can cause the working level sensor to sense a pressure, a temperature, or a depth etc. When the first phase process of working end 2031 ends, and we operate upper cover 2050 (together with second phase working end driving medium 2045), working end 2031 will start a second phase process.

The different features of this embodiment are summarized as follows. The device body has an internal thread; and/or the work body has an operating piece and a work piece driving medium connected to the operating piece.

In this embodiment, it is known that the device body has an internal thread and an external thread; and/or the work body has a first phase work piece driving medium and a second phase work piece driving medium, and the second phase work piece driving medium is configured within the first phase work piece driving medium.

The embodiment above may further include a bottom fastener connected with the device positioning piece, wherein the device body is fastened to the bottom fastener; and/or a fastening piece connected to the device body for fastening the work body to the device body.

The health-care device of the embodiment above may further comprise: a positioning piece to position the work piece at a bottom of the second phase work piece driving medium; and/or a first phase operating medium and a second phase operating medium to respectively operate the first phase working end driving medium and the second phase working end driving medium and respectively determine a first phase working level position and a second phase working level position of the work piece based thereon. As shown in the figures, the second phase operating medium can be acted by upper cover 2050, and a second phase working end driving medium passes upward through first phase operating medium 2035 to be fastened to upper cover 2050.

The core spirit of all the above embodiments is summarized as follows. A health-care device comprises a work piece having an operating end and an opposite working end, wherein the working end is used to perform a health-care work on a specific part or an acupoint of a body part of a user, wherein the working end has a tip and the body part has a skin surface; a work body mounts the operating end on its lower part to allow the user through operating the operating end or the work body to maintain a specific working relationship between the working end or the tip and the specific part or the acupoint; and a device positioning piece connected to the work body to allow the user to position the work body on the body part to maintain a specific working relationship between the working end or the tip and the specific part or the acupoint.

The health-care device of the above core embodiment, wherein the specific working relationship is directly maintained between the working end or tip and the specific part or the acupoint; and/or the the health-care work is performed by adopting one selected from a group consisting of an electrical stimulation, a light stimulation, a thermal stimulation, a non-invasive or a non-contact acupoint stimulation mode, a microwave stimulation, a magnetic stimulation, an acupuncture, a moxibustion, and a combination thereof; and/or the device positioning piece is a flexible piece configured around the body part, or a mechanism piece fixed to the body part.

Although the possible implementations of the embodiments above-described are not completely illustrated in detail, there are many contents that can be mutually referred to or replaced among the embodiments. Therefore, an embodiment is likely to be a reference for alternative other embodiments. For example, the through grooves 406/408 and the interlocking media 398/400 (402/404) in FIG. 16 can be modified by referring to the mooring media 52/56 in FIG. 4 or the mooring media 110 in FIG. 6. Because this disclosure is already too long, it is not elaborated on here to save all parties' efforts.

In summary, the implementations of this disclosure can be modified in many ways by those skilled in the art, which are all included within and belong to the defined scope of the appended claims that the Applicant desires to protect.

The invention claimed is:

1. A health-care device, comprising:

a device body;

a work piece having an operating end and an opposite working end, wherein the working end has a tip and is configured to perform a health-care work on a specific part or an acupoint on a body part of a user;

a work body connected to the device body and having an upper part and a lower part, wherein the operating end engages with the lower part for the user to maintain a specific working relationship between the working end or the tip and the specific part or the acupoint via operating the work body;

a device positioning piece connecting thereto the device body for positioning the device body on the body part to maintain a specific positional relationship between the working end or the tip and the specific part or the acupoint;

a bottom fastener located below the device body and connected to the device positioning piece, wherein the device body is a lower housing, the lower housing is fastened to the bottom fastener, the lower housing has an external thread and a central opening for a user to align the central opening with the acupoint and pass therethrough the working end, the bottom fastener has a total height in a range between 10% and 35% of a total height of the health-care device in a non-operating state, and the bottom fastener has a coaxial central opening for the user to align the central opening with the acupoint; and a lower fastening piece having an internal thread screwedly engaging with the external thread, wherein the lower fastening piece has a minimum inner diameter, the work body has a characteristic maximum outer diameter, and the minimum inner diameter is smaller than the characteristic maximum outer diameter.

2. The health-care device as claimed in claim 1, wherein the work body is an upper housing connected to the device body, so that when the specific working relationship between the working end or the tip and the acupoint is maintained, the health-care work is performed on the specific part or the acupoint via the work piece.

3. The health-care device as claimed in claim 1, further comprising:

a working level sensor, a circuit board electrically connected to the working level sensor, a battery electrically connected to the circuit board, a USB charging socket electrically connected to the circuit board, an upper housing for accommodating the circuit board, the battery and the USB charging socket, an assistant positioning piece for assisting in positioning the working level sensor, and an upper fastening piece to fasten the work piece, the working level sensor and the assistant positioning piece to a bottom of the upper housing and protrude the working end downward from the upper fastening piece.

4. The health-care device as claimed in claim 1, wherein the device body and the work body are one-piece formed.

5. The health-care device as claimed in claim 1, wherein the device positioning piece has an end configured with an elastic piece for clamping thereto the body part.

6. The health-care device as claimed in claim 1, wherein the operating end and the working end are one-piece formed.

7. The health-care device as claimed in claim 1, wherein the work body has an operating piece and a work piece driving medium connected with the operating piece.

8. The health-care device as claimed in claim 1, wherein the device body has an internal thread.

9. The health-care device as claimed in claim 1, wherein the work body includes a first phase work piece driving medium and a second phase work piece driving medium, and the second phase work piece driving medium is configured within the first phase work piece driving medium.

10. The health-care device as claimed in claim 9, further comprising:

a positioning piece for positioning the work piece at a bottom of the second phase work piece driving medium.

11. The health-care device as claimed in claim 9, further comprising:

a first operating medium operating the first phase work piece driving medium to rest the work pierce at a first working position; and a second operating medium operating the second phase work piece driving medium to rest the work piece at a second working position.

12. A health-care device, comprising:

a device body;

a work piece having an operating end and an opposite working end, wherein the working end has a tip and is configured to perform a health-care work on a specific part or an acupoint on a body part of a user;

a work body connected to the device body and having an upper part and a lower part, wherein the operating end engages with the lower part for the user to maintain a specific working relationship between the working end or the tip and the specific part or the acupoint via operating the work body;

a device positioning piece connecting thereto the device body for positioning the device body on the body part to maintain a specific positional relationship between the working end or the tip and the specific part or the acupoint; and a bottom fastener located below the device body and connected to the device positioning piece;

wherein the device body is a lower housing, and the lower housing has a central opening to pass therethrough the working end, the lower housing is fastened to the bottom fastener, and the bottom fastener has a coaxial central opening for the user to align the central opening with the acupoint;

wherein the lower fastening piece has a minimum inner diameter, the work body has a characteristic maximum outer diameter, and the minimum inner diameter is smaller than the characteristic maximum outer diameter.

13. The health-care device as claimed in claim 12, wherein the health-care work is performed by adopting a means being one selected from a group consisting of: an electrical stimulation, a light stimulation, a thermal stimulation, a non-invasive or non-contact acupoint stimulation mode, a microwave stimulation, a magnetic stimulation, an acupuncture stimulation, a moxibustion stimulation and a combination thereof.

14. The health-care device as claimed in claim 12, wherein the lower housing is fastened to the bottom fastener and the bottom fastener has an external thread, the health-care device further includes a lower fastening piece having an internal thread screwedly engaging with the external thread.

15. The health-care device as claimed in claim 12, wherein the working end or the tip is configured to maintain the specific positional relationship through a direct contact between the working end or the tip and the specific part or the acupoint, and the device positioning piece is a flexible configured to be fastened to the body part or a mechanical piece configured to be fixed on the body part.

16. A health-care method, comprising:

providing a health-care device including:

a device positioning piece including a first opening; and an assembly detachably configured on the device positioning piece, and configured to perform a health-care work on a specific part or an acupoint on a body part of a user, and including:

an operating end and an opposite working end configured to pass through the first opening;

a device body connecting to the device positioning piece and having a central opening to pass therethrough the working end;

a work piece having the operating end and the opposite working end;

a work body connected to the device body and having an upper part and a lower part, wherein the lower part engages with the operating end; and a bottom connecting piece located below the device body and connecting the work body to the device positioning piece, wherein the first opening is located at a center of the bottom connecting piece;

aligning the first opening of the device positioning piece with the specific part or the acupoint on the body part of the user;

attaching the assembly on the device positioning piece securely and axially aligning the first opening with the central opening; and operating the operating end by the user to secure a specific working relationship between the working end and the specific part or the acupoint.

17. The health-care method as claimed in claim 16, further comprising:

fixing the device positioning piece to the body part of the user.

* * * * *